(12) United States Patent
Shimada et al.

(10) Patent No.: US 8,499,195 B2
(45) Date of Patent: Jul. 30, 2013

(54) FAILURE CAUSE ESTIMATION DEVICE AND FAILURE CAUSE ESTIMATION METHOD

(75) Inventors: Kuniaki Shimada, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 173 days.

(21) Appl. No.: 13/064,462

(22) Filed: Mar. 25, 2011

(65) Prior Publication Data

US 2011/0314332 A1      Dec. 22, 2011

(30) Foreign Application Priority Data

Jun. 16, 2010 (JP) ................................. 2010-137601

(51) Int. Cl.
*G06F 11/00* (2006.01)
(52) U.S. Cl.
USPC ............................................................ 714/26
(58) Field of Classification Search
USPC ............................................................ 714/26
See application file for complete search history.

(56) References Cited

U.S. PATENT DOCUMENTS

| | | | | |
|---|---|---|---|---|
| 4,857,918 A * | 8/1989 | Nukushina et al. | ...... | 340/870.01 |
| 5,127,005 A * | 6/1992 | Oda et al. | ......... | 714/26 |
| 5,548,714 A * | 8/1996 | Becker | ............. | 714/26 |
| 7,616,007 B2 * | 11/2009 | Nakayama | ..................... | 324/601 |
| 7,844,873 B2 * | 11/2010 | Funatsu | ......................... | 714/741 |
| 8,132,049 B2 * | 3/2012 | Yasukawa et al. | .............. | 714/26 |
| 8,166,335 B2 * | 4/2012 | Kawamura et al. | ............... | 714/1 |
| 8,196,004 B1 * | 6/2012 | Tang | .............. | 714/755 |
| 2003/0120459 A1 * | 6/2003 | Lee et al. | ........................ | 702/181 |
| 2004/0260678 A1 * | 12/2004 | Verbowski et al. | ................ | 707/3 |
| 2005/0283682 A1 * | 12/2005 | Odawara et al. | ................. | 714/42 |
| 2006/0236056 A1 * | 10/2006 | Nagata | .......................... | 711/165 |
| 2007/0136012 A1 * | 6/2007 | Miller | .............................. | 702/67 |
| 2008/0201971 A1 * | 8/2008 | Heiden et al. | .................... | 33/503 |
| 2008/0239318 A1 * | 10/2008 | Den Boef et al. | ............. | 356/369 |
| 2008/0256404 A1 * | 10/2008 | Funatsu | ......................... | 714/724 |
| 2009/0049344 A1 * | 2/2009 | Kawamura et al. | .............. | 714/46 |
| 2010/0292959 A1 * | 11/2010 | Gross et al. | .................... | 702/181 |
| 2010/0318864 A1 * | 12/2010 | Funatsu | ......................... | 714/726 |
| 2011/0119536 A1 * | 5/2011 | Miller | ........................... | 714/704 |
| 2011/0246832 A1 * | 10/2011 | Akiyama et al. | ................. | 714/37 |

FOREIGN PATENT DOCUMENTS

| | | |
|---|---|---|
| JP | 2005-251091 | 9/2005 |
| JP | 2007-323558 | 12/2007 |

OTHER PUBLICATIONS

Yikxin Diao et al.; "Rule-based Problem Classification in IT Service Management" by Diao et al., pp. 221-228, 2009 IEEE International Conference on Cloud Computing, 2009.

* cited by examiner

*Primary Examiner* — Kamini Patel
(74) *Attorney, Agent, or Firm* — Staas & Halsey LLP

(57) ABSTRACT

A failure cause estimation device includes: a database that manages the causes of failure cases, questions, and replies thereto for each of the failure cases; a condition presentation unit that presents combinations of the questions and replies managed in the database on a display screen as branch conditions used to classify the cause of a failure case; a condition selection unit that selects at least one branch condition from the presented branch conditions according selection operation; a cause estimation unit that estimates a cause satisfying the at least one branch condition from the contents of the database; and a cause presentation unit that presents the estimated cause on the display screen as a cause candidate.

10 Claims, 21 Drawing Sheets

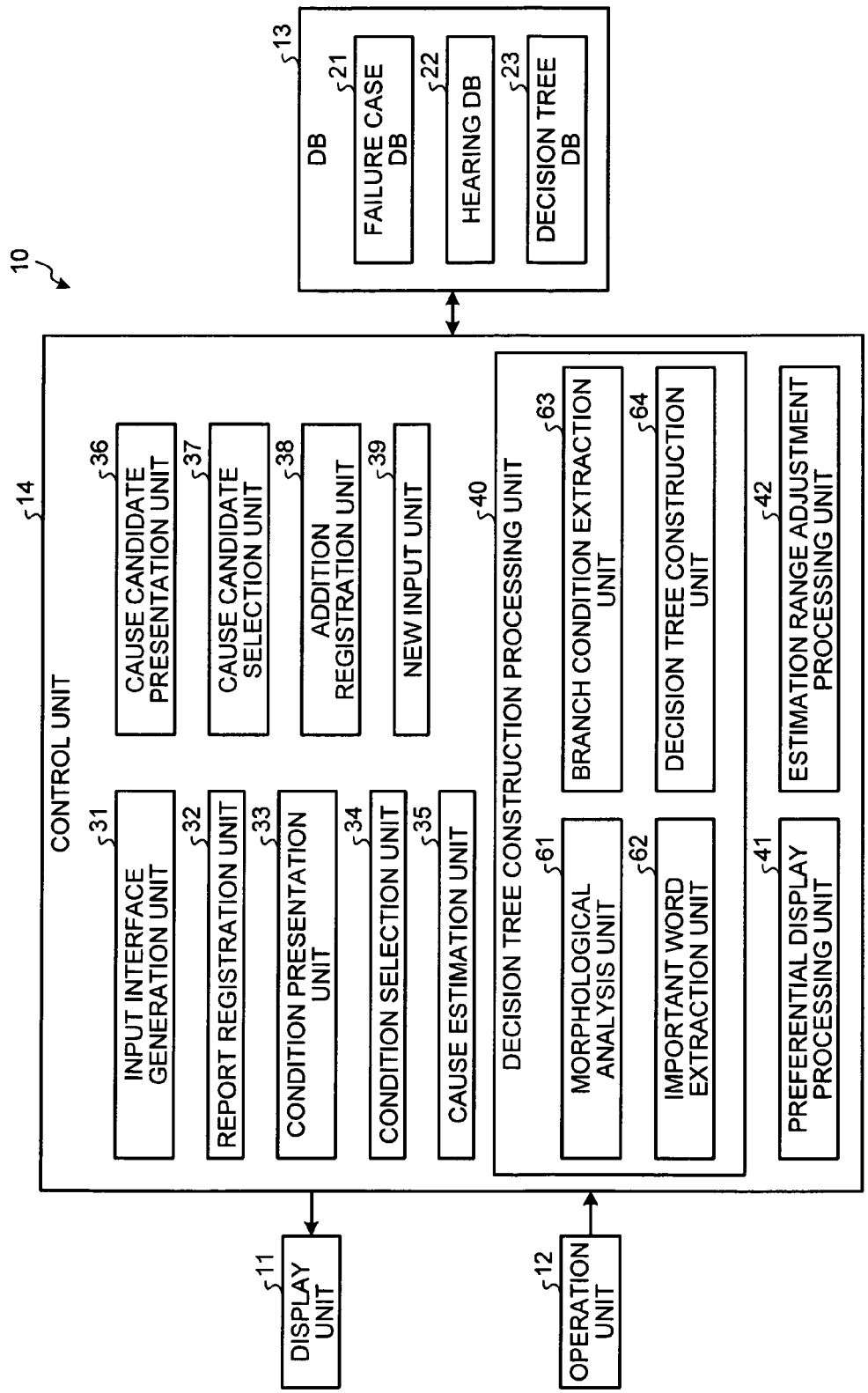

FIG.3

| | | |
|---|---|---|
| ID | 0123456789 | |
| QUESTION (SYMPTOM) | ACCESS TO WEB SERVER IS SLOW | |
| REPLY (CAUSE) | RESPONSE DELAY DUE TO OUTPUT OF LARGE LOG | |
| BRANCH CONDITIONS | QUESTION (ATTRIBUTE) | REPLY (ATTRIBUTE VALUE) |
| | DELAYED PROCESS | BOTH |
| | INFLUENCE OF AMOUNT OF LOAD | FAST FOR SINGLE PROCESS |
| EXCHANGE DETAILS | | |

2009/10/10 13:30
ACCESS TO THE WEB SERVER WAS SLOW. BOTH BATCH AND REAL TIME PROCESSES WERE DELAYED. COLLECTION OF INFORMATION OF A AND B WAS REQUESTED.

2009/10/10 14:30

⋮

(24A: ID, 24B: QUESTION (SYMPTOM), 24C: REPLY (CAUSE), 24E: BRANCH CONDITIONS, 24D: EXCHANGE DETAILS, ADDITION FIELD)

FIG.4

| BRANCH CONDITIONS | ATTRIBUTE (QUESTION) | ATTRIBUTE VALUE (REPLY) | ATTRIBUTE VALUE (REPLY) | ATTRIBUTE VALUE (REPLY) |
|---|---|---|---|---|
| | DELAYED PROCESS | BOTH | BATCH PROCESS | ONLINE PROCESS |
| | INFLUENCE OF AMOUNT OF LOAD | FAST FOR SINGLE PROCESS | SLOW EVEN FOR SINGLE PROCESS | |

FIG.5

```
DELAYED PROCESS=BOTH
| INFLUENCE OF AMOUNT OF LOAD=SLOW EVEN FOR SINGLE PROCESS:
   REAL TIME SCAN BY VIRUS SCANNING SOFTWARE (9)
| INFLUENCE OF AMOUNT OF LOAD=FAST FOR SINGLE PROCESS:
   RESPONSE DELAY DUE TO OUTPUT OF LARGE LOG (8)
DELAYED PROCESS=ONLINE PROCESS
| SIGNIFICANTLY DELAYED PROCESS=REFERENCE
| | TIME THE DELAY OCCURRED=SLOW FROM THE BEGINNING OF OPERATION:
     DB ENVIRONMENT TROUBLE (FULL-SCAN OCCURRED) (3)
| | TIME THE DELAY OCCURRED=PROCESS WAS SUDDENLY SLOWED DOWN
     AT CERTAIN TIMING: DB ENVIRONMENT TROUBLE (ACCESS PATH CHANGED) (2)
| SIGNIFICANTLY DELAYED PROCESS=BOTH
| | TIME THE DELAY OCCURRED=SLOW FROM THE BEGINNING OF OPERATION
| | | DELAYED SERVER=DB SERVER: INCREASE IN ANALYSIS COST DUE TO USE
       OF LITERAL VALUE (1)
| | | DELAYED SERVER=WEB SERVER: RESPONSE DELAY DUE TO FullGC (6)
| | TIME THE DELAY OCCURRED=GRADUALLY
| | | OS OF AP SERVER=Windows:
       INSUFFICIENT NUMBER OF CONNECTIONS DUE TO KeepAlive (4)
| | | OS OF AP SERVER=Linux: ONLINE DELAY DURING BATCH EXECUTION (5)
| | TIME THE DELAY OCCURRED=PROCESS WAS SUDDENLY SLOWED DOWN AT
     CERTAIN TIMING: OVERLOAD ON CPU DUE TO INCREASE IN AMOUNT OF WORK (7)
```

| REAL TIME SCAN BY VIRUS SCANNING SOFTWARE<br>- DELAYED PROCESS (BOTH)<br>- INFLUENCE OF AMOUNT OF LOAD<br>  (SLOW EVEN FOR SINGLE PROCESS) | RESPONSE DELAY DUE TO OUTPUT OF LARGE LOG<br>- DELAYED PROCESS (BOTH)<br>- INFLUENCE OF AMOUNT OF LOAD<br>  (FAST FOR SINGLE PROCESS) |
|---|---|
| DB ENVIRONMENT (FULL-SCAN OCCURRED)<br>- DELAYED PROCESS (ONLINE PROCESS)<br>- SIGNIFICANTLY DELAYED PROCESS<br>  (REFERENCE)<br>- TIME THE DELAY OCCURRED<br>  (FROM THE BEGINNING OF OPERATION) | DB ENVIRONMENT<br>(ACCESS PATH CHANGED)<br>- DELAYED PROCESS<br>  (ONLINE PROCESS)<br>- SIGNIFICANTLY DELAYED PROCESS<br>  (REFERENCE)<br>- TIME THE DELAY OCCURRED<br>  (PROCESS WAS SUDDENLY SLOWED DOWN AT CERTAIN TIMING) |
| INCREASE IN ANALYSIS COST DUE TO USE OF LITERAL VALUE<br>- DELAYED PROCESS (ONLINE PROCESS)<br>- SIGNIFICANTLY DELAYED PROCESS<br>  (BOTH)<br>- TIME THE DELAY OCCURRED<br>  (FROM THE BEGINNING OF OPERATION)<br>- DELAYED SERVER (DB SERVER) | RESPONSE DELAY DUE TO FullGC<br>- DELAYED PROCESS<br>  (ONLINE PROCESS)<br>- SIGNIFICANTLY DELAYED PROCESS<br>  (BOTH)<br>- TIME THE DELAY OCCURRED<br>  (FROM THE BEGINNING OF OPERATION)<br>- DELAYED SERVER (WEB SERVER) |
| INSUFFICIENT NUMBER OF CONNECTIONS DUE TO KeepAlive<br>- DELAYED PROCESS (ONLINE PROCESS)<br>- SIGNIFICANTLY DELAYED PROCESS<br>  (BOTH)<br>- TIME THE DELAY OCCURRED<br>  (GRADUALLY)<br>- OS OF AP SERVER (Windows) | ONLINE DELAY DURING BATCH EXECUTION<br>- DELAYED PROCESS (ONLINE PROCESS)<br>- SIGNIFICANTLY DELAYED PROCESS<br>  (BOTH)<br>- TIME THE DELAY OCCURRED<br>  (GRADUALLY)<br>- OS OF AP SERVER (Linux) |
| OVERLOAD ON CPU DUE TO INCREASE IN AMOUNT OF WORK<br>- DELAYED PROCESS (ONLINE PROCESS)<br>- SIGNIFICANTLY DELAYED PROCESS<br>  (BOTH)<br>- TIME THE DELAY OCCURRED<br>  (PROCESS WAS SUDDENLY SLOWED DOWN AT CERTAIN TIMING) | |

| | | |
|---|---|---|
| 410A | ID | 0123456789 |
| 410B | QUESTION (SYMPTOM) | ACCESS TO WEB SERVER IS SLOW |
| 410C | REPLY (CAUSE) | RESPONSE DELAY DUE TO OUTPUT OF LARGE LOG |
| 410D | EXCHANGE DETAILS | |

2009/10/10 13:30
ACCESS TO THE WEB SERVER WAS SLOW. BOTH BATCH AND REAL TIME PROCESSES WERE DELAYED. COLLECTION OF INFORMATION OF A AND B WAS REQUESTED.

2009/10/10 14:30

⋮

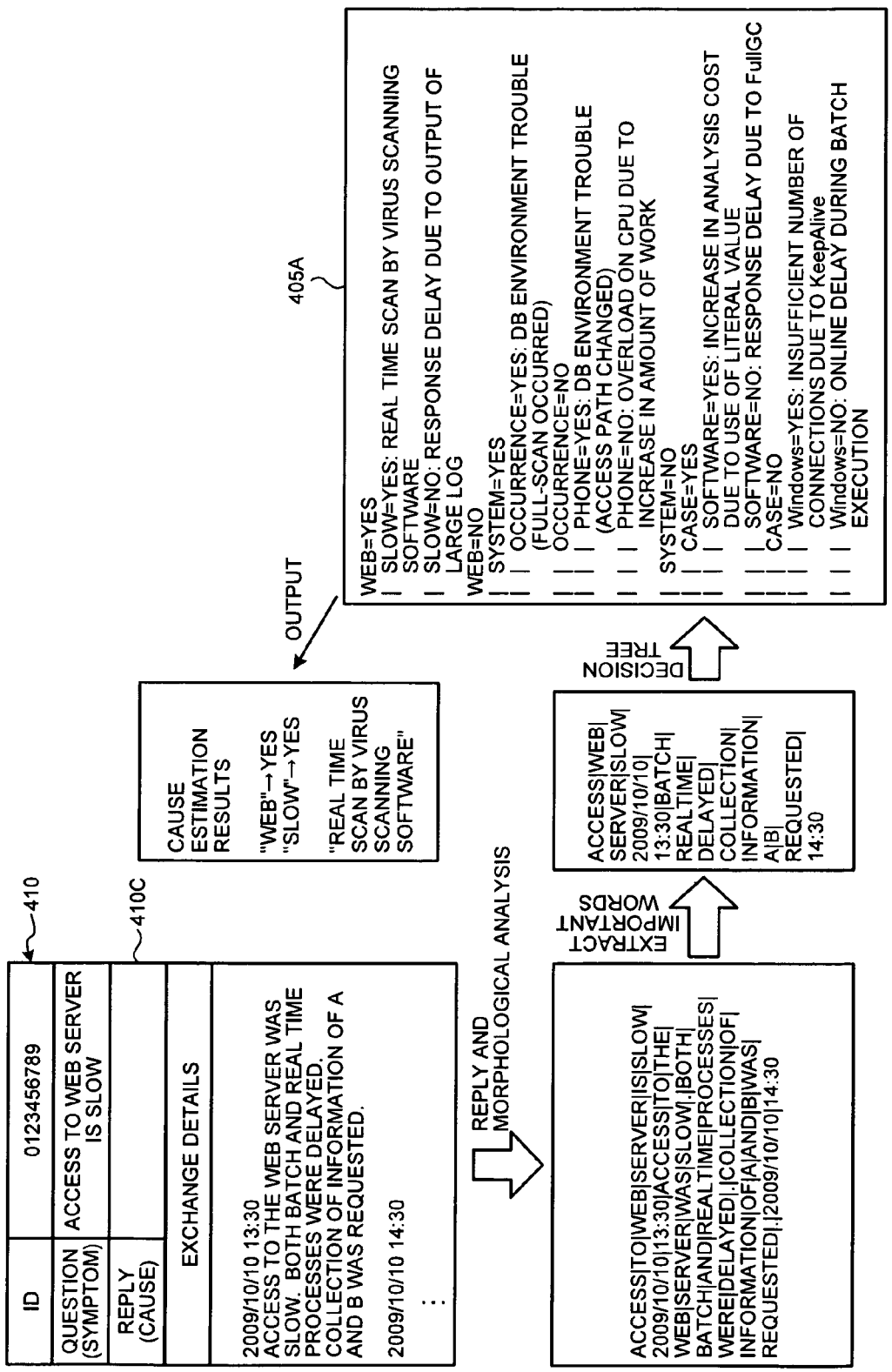

FAILURE CAUSE ESTIMATION DEVICE AND FAILURE CAUSE ESTIMATION METHOD

CROSS-REFERENCE TO RELATED APPLICATIONS

This application is based upon and claims the benefit of priority of the prior Japanese Patent Application No. 2010-137601, filed on Jun. 16, 2010, the entire contents of which are incorporated herein by reference.

FIELD

The embodiments discussed herein are directed to a failure cause estimation device, a failure cause estimation program, and a failure cause estimation method.

BACKGROUND

In a recent well-known operation maintenance system for an IT system, for example, failure cases including the symptoms and causes of the failures are managed and used for the search for the cause corresponding to a symptom, and possible causes are presented as the search results. In addition, ITIL (IT Infrastructure Library) produced by the UK Office of Government and Commerce in late 1980 is recently being used in the technical field of operation and maintenance. With the ITIL, there is a demand to reduce the time from the occurrence of a failure until its restoration so that improvement in service quality and reduction in cost are achieved.

A conventional failure case search system will be next described. FIG. 18 is a diagram illustrating an exemplary conventional failure case search system. A failure case search system 300 illustrated in FIG. 18 is connected to a database 301 in which failure cases including their related symptoms and causes have been registered. An administrator accesses the failure case search system 300 using a terminal 302 and inputs a keyword for the phenomenon of a current failure. The failure case search system 300 searches the database 301 for the cause of the failure case corresponding to the keyword and then displays the search results as a list of possible causes on the display screen of the terminal 302.

The administrator consults the list of the possible causes on the display screen to recognize the cause of a failure case similar to the current failure case and can thereby rapidly recover the failure according to the recognized cause.

However, in the conventional failure case search system 300, the administrator, for example, creates the failure cases in a free format. Therefore, if the keyword used for the search for a failure case is too peculiar, the number of hits for similar failure cases is significantly low, so that these failure cases cannot be narrowed down. In addition, in the conventional failure case search system 300, if the keyword used for the search for a failure case is too general, the number of hits for similar failure cases is large, so that these failure cases cannot be narrowed down. Therefore, in the failure case search system 300, since the possible failure cases cannot be narrowed down, the cause of the current failure case cannot be identified, and the recovery of the failure takes a long time.

In one known failure cause estimation device, the causes of failure cases similar to a currently processed failure case are estimated using a decision tree created from reports describing the examination results for past failure cases without searching the failure cases themselves, and the estimated causes are presented.

FIG. 19 is a diagram illustrating the operation in a failure case registration stage in the above conventional failure cause estimation device, and FIG. 20 is a diagram illustrating an example of the failure case used in the conventional failure cause estimation device. In FIG. 19, upon reception of input of a report including the examination results for a failure case from the user such as the administrator, a report registration unit 401 of the failure cause estimation device registers the report in a failure case database (hereinafter referred simply as DB) 402 as a failure case. An ID 410A for identifying the failure case, a question 410B about the symptom etc., a reply 410 (for example, the cause) to the question 410B, exchange details 410D including the examination results for the question-reply exchange, and other information are described in the failure case 410.

FIG. 21 is a diagram illustrating the operation in a failure case learning stage in the conventional failure cause estimation device, and FIG. 22 is a diagram illustrating a series of operations until a decision tree is created in the failure case learning stage. A morphological analysis unit 403 of the failure cause estimation device divides text contained in each of failure cases 410 registered in the failure case DB 402 into word units. Then an important word extraction unit 404 extracts important words from the words in the text divided by the morphological analysis unit 403 using, for example, TF-IDF (Term Frequency, Inverse Document Frequency) or a dictionary for collected information.

Then a decision tree construction unit 405 constructs, using the important words extracted by the important word extraction unit 404 and the causes of the failure cases, a decision tree 405A (see FIG. 22) in which the failure cases are organized in an optimal manner. In the decision tree 405A, higher accuracy can be achieved when the collected information described in each failure case is used as branch conditions. However, the dictionary for collected information is not always provided. Therefore, when TF-IDF instead of the dictionary is used for extraction, the important words are extracted using a threshold value set for the rareness of each word, so that words in the collected information are not necessarily extracted. The collected information is, for example, an error message log, such as a system log or a software log, acquired upon request, a definition file for environment setting for operating software, or a dump outputted when abnormal termination occurs. Then the decision tree construction unit 405 registers the constructed decision tree 405A in a decision tree DB 406. The decision tree construction unit 405 automatically creates the decision tree 405A at predetermined timing.

FIG. 23 is a diagram illustrating the operation in a cause estimation stage in the conventional failure cause estimation device, and FIG. 24 is a diagram illustrating a series of operations in the cause estimation stage until the cause is estimated. When no description of cause 410C is given in the failure case 410 as illustrated in FIG. 24, the failure cause estimation device presents the cause of a similar failure case to the user.

Upon reception of input of a failure case the cause of which is to be estimated, the morphological analysis unit 403 of the failure cause estimation device divides the text of the failure case into word units. Then the important word extraction unit 404 extracts important words from the words in the text divided by the morphological analysis unit 403 using, for example, TF-IDF. A cause estimation unit 407 uses the important words extracted by the important word extraction unit 404 as branch conditions to estimate the cause of the failure case from the decision tree 405A according to the truth or falsity of the branch conditions.

For example, since the important words in the currently processed failure case include branch conditions "web" and "slow", the cause estimation unit 407 estimates the cause as "real time scan by virus scanning software" from the decision tree 405A. Then the failure cause estimation device presents, as a candidate of the cause, the estimation result from the cause estimation unit 407 on a display screen.

In the above conventional failure cause estimation device, the collected information is in a predetermined format such as an error message format. Therefore, it is not necessary to take notational variants into consideration, and the cause of a failure case can be estimated from the decision tree even when the collected information is used for branch conditions. However, in the above conventional failure cause estimation device, notational variants can occur if questions, replies, etc. that cannot be obtained from collected information and are obtained from, for example, interviews are used, because general words are used in such questions and replies. When these questions and replies are used as branch conditions, it is difficult to estimate the cause of the failure case from the decision tree. Therefore, even when questions and replies are obtained from interviews, collected information must be obtained later, and the time from the estimation of the cause until the recovery of the failure is long.

Patent Document 1: Japanese Laid-open Patent Publication No. 2005-251091
Patent Document 2: Japanese Laid-open Patent Publication No. 2007-323558
Non-Patent Document 1: Yixin Diao, Hani Jamjoom, David Loewenstern, "Rule-Based Problem Classification in IT Service Management", cloud, pp. 221 to 228, 2009 *IEEE International Conference on Cloud Computing*, 2009

SUMMARY

According to an aspect of an embodiment of the invention, a failure cause estimation device includes a database that manages causes of past failure cases, questions, and replies thereto for each of the past failure cases; a condition presentation unit that presents combinations of the questions and the replies thereto managed in the database on a display screen as branch conditions used to classify a cause of a failure case; a condition selection unit that selects, according to a selection operation, at least one branch condition from the branch conditions presented by the condition presentation unit; a cause estimation unit that estimates, from contents of the database, at least one cause satisfying the at least one branch condition selected by the condition selection unit; and a cause presentation unit that presents the at least one cause estimated by the cause estimation unit on the display screen as at least one cause candidate.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a block diagram illustrating the internal structure of a failure cause estimation device in a second embodiment;
FIG. 3 is a diagram illustrating an exemplary data structure of a failure case;
FIG. 4 is a diagram illustrating an exemplary table structure in an interview DB;
FIG. 5 is a diagram illustrating an exemplary decision tree;
FIG. 16 is a diagram illustrating an example of the operation in the estimation range adjustment processing;
FIG. 24 is a diagram illustrating a series of operations in the cause estimation stage until the cause is estimated.

DESCRIPTION OF EMBODIMENTS

Preferred embodiments of the present invention will be explained with reference to accompanying drawings. However, the disclosed technology is not limited to the embodiments.

[a] First Embodiment

Figure 1:
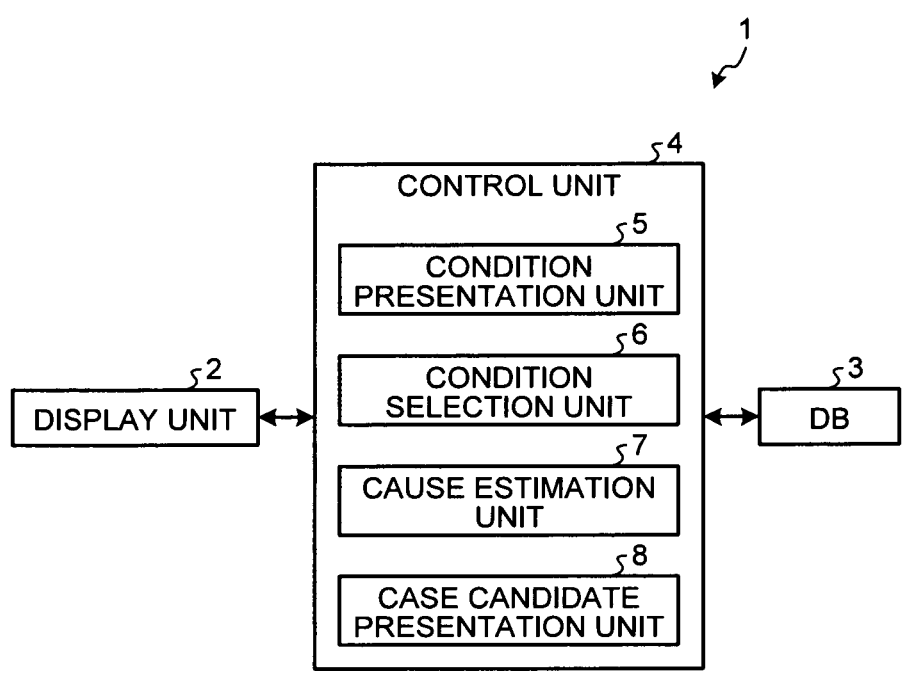
FIG. 1 is a block diagram illustrating the internal structure of a failure cause estimation device in a first embodiment.

FIG. 1 is a block diagram illustrating the internal structure of a failure cause estimation device in a first embodiment. A failure cause estimation device 1 illustrated in FIG. 1 includes a display unit 2, a database (hereinafter referred simply to as DB) 3, and a control unit 4. The DB 3 manages the causes of past failure cases, questions, and replies thereto for each past failure case. The control unit 4 includes a condition presentation unit 5, a condition selection unit 6, a cause estimation unit 7, and a cause candidate presentation unit 8.

The condition presentation unit 5 presents combinations of questions and replies thereto managed by the DB 3 on the display screen of the display unit 2 as branch conditions used to classify the cause of a failure case. The condition selection unit 6 selects, according to the selection operation by the user, at least one branch condition from the branch conditions presented on the display screen by the condition presentation unit 5.

The cause estimation unit 7 estimates, from the contents of the DB 3, causes that satisfy the branch condition selected by the condition selection unit 6. The cause candidate presentation unit 8 presents the causes estimated by the cause estimation unit 7 on the display screen as cause candidates.

In the first embodiment, combinations of questions and replies pre-registered in the DB 3 are presented on the display screen as branch conditions in a selectable manner, and cause candidates that satisfy a selected branch condition are presented on the display screen. Therefore, branch conditions corresponding to additional questions and replies that are obtained from interviews and cannot be obtained from conventional collected information can be selected on the display screen, and notational variants in the additional branch conditions can be absorbed. In addition, since the branch conditions in which the results of the interviews are reflected are used, the estimation accuracy for the cause candidates can be improved.

[b] Second Embodiment

FIG. 2 is a block diagram illustrating the internal structure of a failure cause estimation device in a second embodiment. A failure cause estimation device 10 illustrated in FIG. 2 includes a display unit 11, an operation unit 12, a DB 13, and a control unit 14. The display unit 11 displays various types of information on a display screen. The operation unit 12 corresponds to, for example, a keyboard or a mouse for inputting various types of information and instructions. The DB 13 manages the causes of past failure cases, questions, and replies thereto for each failure case. The DB 13 includes a failure case DB 21, an interview DB 22, and a decision tree DB 23.

The failure case DB 21 manages past failure cases. FIG. 3 is a diagram illustrating an exemplary data structure of a past failure case. The failure case 24 illustrated in FIG. 3 includes an ID 24A for identifying the failure case 24, a question 24B about the failure case 24 (for example, the symptom thereof), a reply 24C (for example, the cause of the failure case 24), exchange details 24D including the examination results for the question-reply exchange, and branch conditions 24E described later.

The branch conditions 24E are combinations of additional questions inputted or selected using an input interface screen described later and replies to the questions. In the branch conditions 24E, for example, the questions correspond to attributes, and the replies correspond to attribute values. In the branch conditions 24E in the example in FIG. 3, the reply to a question "DELAYED PROCESS" is "BOTH", and the reply to a question "INFLUENCE OF AMOUNT OF LOAD" is "FAST FOR SINGLE PROCESS".

The interview DB 22 manages branch conditions inputted or selected using the input interface screen described later. FIG. 4 is a diagram illustrating an exemplary table structure in the interview DB 22. The interview DB 22 illustrated in FIG. 4 manages questions 22A corresponding to attributes together with replies 22B corresponding to attribute values.

In the example in FIG. 4, a question "DELAYED PROCESS" has three replies ("BOTH", "BATCH PROCESS", and "ONLINE PROCESS").

The decision tree DB 23 manages a decision tree 25 used to estimate the cause of the failure case 24. FIG. 5 is a diagram illustrating an example of the decision tree 25. For example, for the question "DELAYED PROCESS", the decision tree 25 illustrated in FIG. 5 branches into two replies ("BOTH" and "ONLINE PROCESS"). When the reply is "BOTH", the decision tree 25 further branches into two replies ("SLOW EVEN FOR SINGLE PROCESS" and "FAST FOR SINGLE PROCESS") to a question "INFLUENCE OF AMOUNT OF LOAD". In the tree structure of the decision tree 25, when the reply is "SLOW EVEN FOR SINGLE PROCESS", "REAL TIME SCAN BY VIRUS SCANNING SOFTWARE" is estimated as the cause.

The control unit 14 illustrated in FIG. 2 includes an input interface generation unit 31, a report registration unit 32, a condition presentation unit 33, a condition selection unit 34, a cause estimation unit 35, a cause candidate presentation unit 36, a cause candidate selection unit 37, an addition registration unit 38, and a new input unit 39. The input interface generation unit 31 generates an input interface screen 50 for inputting or selecting a branch condition and displays the generated input interface screen 50 on the display unit 11. Upon reception of input of a report containing the examination results for a failure case from the user such as an administrator, the report registration unit 32 registers the report in the failure case DB 21 as a failure case.

The condition presentation unit 33 presents, on the input interface screen 50, questions and replies for branch conditions registered in the interview DB 22. The condition selection unit 34 selects, according to the operation by the user, questions and replies that apply to the current failure case from the questions and replies in the branch conditions presented on the input interface screen 50. The cause estimation unit 35 estimates, from the decision tree 25, causes that satisfy the branch conditions including the questions and replies selected by the condition selection unit 34.

Then the cause candidate presentation unit 36 presents the causes estimated by the cause estimation unit 35 on the input interface screen 50 as cause candidates. The cause candidate selection unit 37 selects, according to the operation by the user, a cause from the cause candidates presented on the input interface screen 50. The addition registration unit 38 additionally registers, according to the operation by the user, the cause selected by the cause candidate selection unit 37 and the combinations of the questions and replies in the branch conditions used for the selected cause in the failure case DB 21 through the input interface screen 50 as the current failure case.

When the branch conditions presented on the input interface screen 50 do not include any branch condition that applies to the current failure case, the new input unit 39 allows reception of input of a new branch condition. Examples of the new branch condition include a new reply to a presented question and a combination of a new question and a new reply. In this case, since the branch condition inputted by the new input unit 39 is new, a cause that satisfies this branch condition is unknown. Therefore, the cause estimation unit 35 estimates the cause using branch conditions other than the new branch condition.

Figure 6:
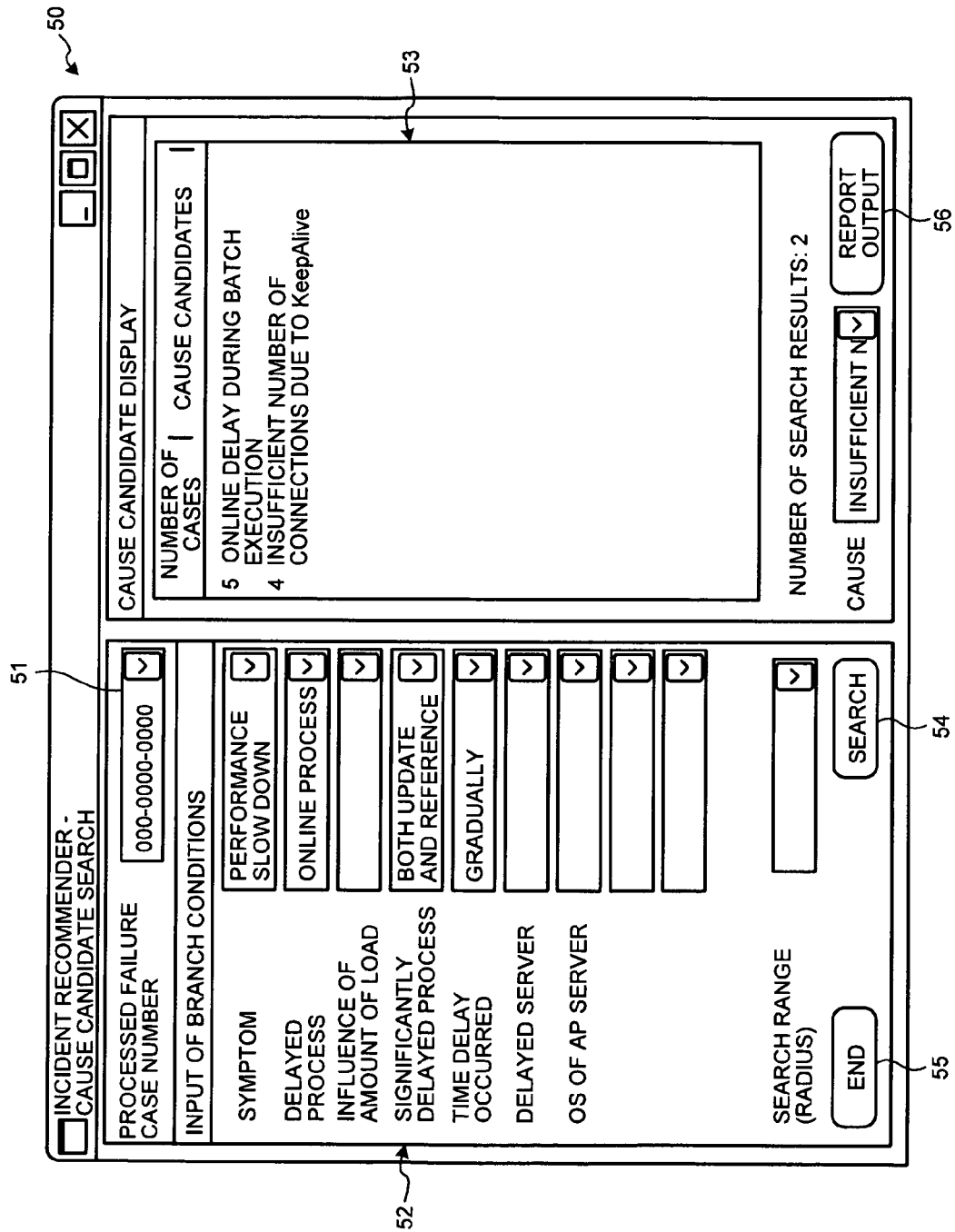
FIG. 6 is a diagram illustrating an exemplary input interface screen.

FIG. 6 is a diagram illustrating an example of the input interface screen 50. The input interface screen 50 illustrated in FIG. 6 includes a failure case number input field 51, a condition presentation field 52, a cause candidate presentation field 53, a search button 54, a quit button 55, and a report output button 56. The failure case number input field 51 corresponds to a field for inputting an ID identifying a failure case. The condition presentation field 52 corresponds to a field for presenting branch conditions used to classify the current failure case using combinations of questions and replies. For example, if one question has a plurality of replies, the condition presentation unit 33 presents the plurality of replies using a selection tab in the condition presentation field 52. The branch conditions presented in the condition presentation field 52 are the questions and replies in branch conditions managed in the interview DB 22. The condition selection unit 34 selects, according to the operation by the user, a question and a reply thereto that apply to the current failure case from the questions presented in the condition presentation field 52.

When the questions presented in the condition presentation field 52 do not include an appropriate question, a new question and a new reply thereto may be inputted. Moreover, when the replies to a question presented in the condition presentation field 52 do not include an appropriate reply, a new reply may be inputted. The new input unit 39 allows input of a new question and a new reply through a new input column in the condition presentation field 52.

The cause candidate presentation field 53 corresponds to a field for presenting the causes estimated by the cause estimation unit 35 as cause candidates. When no branch condition has been selected by the condition selection unit 34, the cause candidate presentation field 53 presents all the causes registered in the failure case DB 21 in the cause candidate presentation field 53 as cause candidates. When a branch condition is selected by the condition selection unit 34, the cause candidate presentation unit 36 presents all the causes satisfying the selected branch condition in the cause candidate presentation field 53 as cause candidates. The cause candidates presented in the cause candidate presentation field 53 by the cause candidate presentation unit 36 are in descending order of the number of cases. The cause candidate selection unit 37 selects, according to the operation by the user, a cause applicable to the current failure case from the cause candidates presented in the cause candidate presentation field 53.

The search button 54 corresponds to a button for starting the estimation operation of the cause estimation unit 35. The quit button 55 corresponds to a button for quitting the input interface screen 50. The report output button 56 corresponds to a button for starting the addition registration operation of the addition registration unit 38. When the report output button 56 is operated, the addition registration unit 38 registers in the failure case DB 21 the cause selected by the cause candidate selection unit 37 as the final cause of the current failure case together with the combinations of the questions and replies in the branch conditions used for the selected cause. This can prevent a failure case in which no cause is described from being registered in the failure case DB 21 in a reliable manner.

The control unit 14 further includes a decision tree construction processing unit 40, a preferential display processing unit 41, and an estimation range adjustment processing unit 42. The decision tree construction processing unit 40 includes a morphological analysis unit 61, an important word extraction unit 62, a branch condition extraction unit 63, and a decision tree construction unit 64. The morphological analysis unit 61 divides the text of each failure case 24 registered in the failure case DB 21 into word units. The important word extraction unit 62 extracts predetermined important words from the words in the text divided by the morphological analysis unit 61. The important word extraction unit 62 uses, for example, TF-IDF (Term Frequency, Inverse Document Frequency). The branch condition extraction unit 63 extracts branch conditions (questions and replies) registered in the interview DB 22 for all the failure cases registered in the failure case DB 21.

The decision tree construction unit 64 constructs the decision tree 25 using the words extracted by the important word extraction unit 62, the branch conditions extracted by the branch condition extraction unit 63, the causes of the registered failures, and other information, and the constructed decision tree 25 is registered in the decision tree DB 23. The decision tree construction unit 64 automatically creates the decision tree 25 at predetermined timing.

Each time a branch condition is selected from the branch conditions presented in the condition presentation field 52 of the input interface screen 50, the preferential display processing unit 41 instructs the condition presentation unit 33 to present the branch conditions in the condition presentation field 52 in descending order of selection possibility in the next selection operation. More specifically, each time a branch condition is selected, the preferential display processing unit 41 computes an evaluation value indicting the selection possibility in the next selection operation for each of the questions in the branch conditions using, for example, entropy (average information content). Then the preferential display processing unit 41 instructs the condition presentation unit 33 to present the branch conditions in the condition presentation field 52 in descending order of the evaluation value. The preferential display processing unit 41 also instructs the condition presentation unit 33 not to present, in the condition presentation field 52, a branch condition including a question with an evaluation value equal to or less than a reference threshold value.

The condition selection unit 34 selects branch conditions sequentially, and the cause estimation unit 35 narrows down the causes in the decision tree 25 using the sequentially selected branch conditions to estimate the final cause. However, the cause estimation unit 35 can estimate a cause that is not appropriate to the current failure case if an incorrect branch condition is selected. In view of the above, the estimation range adjustment processing unit 42 instructs the cause estimation unit 35 to estimate possible causes obtainable from all combinations of the currently selected branch conditions except for one branch condition when a re-search button (not illustrated) is operated. More specifically, the estimation range adjustment processing unit 42 instructs the cause estimation unit 35 to sequentially estimate causes that satisfy the selected branch conditions except for one branch condition. The estimation range adjustment processing unit 42 sequentially stores the sequentially estimated causes. The estimation range adjustment processing unit 42 instructs the cause candidate presentation unit 36 to present all the cause candidates sequentially estimated by the cause estimation unit 35 in the cause candidate presentation field 53.

The operation of the failure cause estimation device 10 in the second embodiment will be next described. The failure cause estimation device 10 includes, for example, three stages including a failure case registration stage, a failure case learning stage, and a cause estimation stage. In the failure case registration stage, a new failure case is registered in the failure case DB 21. In the failure case learning stage, a decision tree 25 reflecting the failure cases registered in the failure case DB 21 is constructed. In the cause estimation stage, the cause of the current failure case is estimated using the decision tree 25, and the cause obtained by the estimation and other information are additionally registered in the failure case DB 21 as the current failure case.

Figure 7:
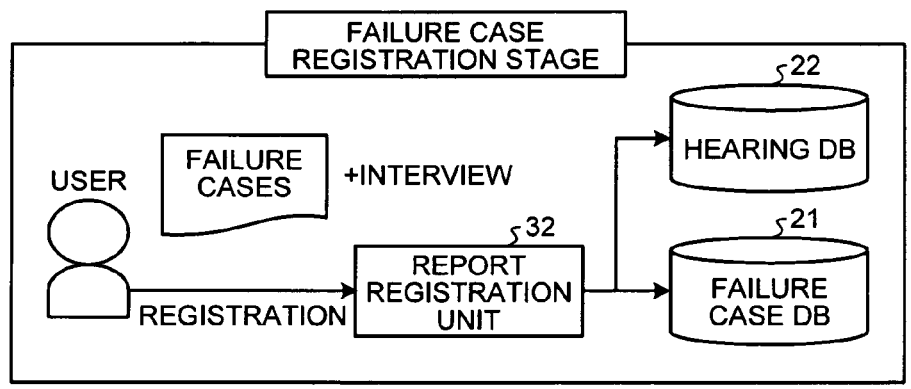
FIG. 7 is a diagram illustrating the operation in a failure case registration stage in the failure cause estimation device in the second embodiment.

FIG. 7 is a diagram illustrating the operation in the failure case registration stage in the failure cause estimation device 10 in the second embodiment. Upon reception of input of a report including the examination results for a failure case from the user such as an administrator, the report registration unit 32 of the failure cause estimation device 10 registers the report in the failure case DB 21 as a failure case. The failure case 24 includes plain text in which an "ID" 24A, a "question (symptom)" 24B, a "reply (cause)" 24C, and "exchange details" 24D such as examination results, except for "branch conditions" 24E. When branch conditions including additional questions and replies are inputted or selected, the branch conditions 24E are added to the text.

The control unit 14 displays the input interface screen 50 on the display unit 11. The condition presentation unit 33 presents combinations of the questions and replies registered in the interview DB 22 in the condition presentation field 52 of the input interface screen 50 as branch conditions. Then the user checks whether or not the branch conditions presented in the condition presentation field 52 include a branch condition that applies to the additional question and reply for the current failure case. The condition selection unit 34 selects, according to the operation by the user, a branch condition presented in the condition presentation field 52. Then the cause estimation unit 35 estimates, from the decision tree 25, causes that satisfy the branch condition selected by the condition selection unit 34. Then the cause candidate presentation unit 36 presents the causes estimated by the cause estimation unit 35 in the cause candidate presentation field 53 as cause candidates.

The cause candidate selection unit 37 selects, according to the operation by the user, one of the cause candidates presented in the cause candidate presentation field 53. After the cause is selected by the cause candidate selection unit 37, the addition registration unit 38 uses the selected cause as the cause of the current failure case and additionally registers a combination of the question and reply in the branch condition used for the estimated cause in the failure case DB 21.

When a branch condition appropriate to the additional question and reply for the current failure case is not presented in the condition presentation field 52, a new branch condition is inputted through the new input unit 39, and the condition selection unit 34 selects the new branch condition. When a new branch condition is additionally registered in the failure case DB 21, the addition registration unit 38 additionally registers the new branch condition also in the interview DB 22.

Figure 8:
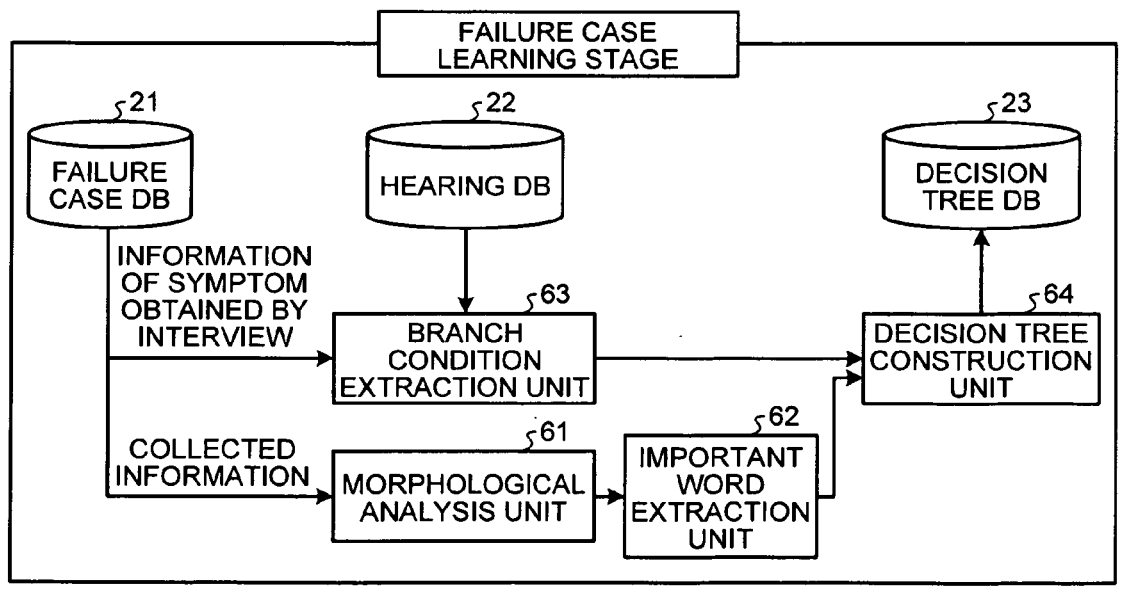
FIG. 8 is a diagram illustrating the operation in a failure case learning stage in the failure cause estimation device in the second embodiment.

The failure case learning stage will be next described. FIG. 8 is a diagram illustrating the operation in the failure case learning stage in the failure cause estimation device 10 in the second embodiment. The decision tree construction processing unit 40 acquires the failure cases registered in the failure case DB 21. The morphological analysis unit 61 divides the text of each of the failure cases registered in the failure case DB 21 into words units. Then the important word extraction unit 62 extracts predetermined important words from the words in the text divided by the morphological analysis unit 61.

The branch condition extraction unit 63 extracts the branch conditions registered in the interview DB 22 for all the failure cases registered in the failure case DB 21. The decision tree construction unit 64 creates a decision tree-use failure case 26 illustrated in FIG. 9 for each failure case using the branch conditions extracted by the branch condition extraction unit 63, the important words extracted by the important word extraction unit 62, and the cause of the failure case. The decision tree-use failure case 26 illustrated in FIG. 9 includes the cause of the failure case and the branch conditions.

Figure 9:
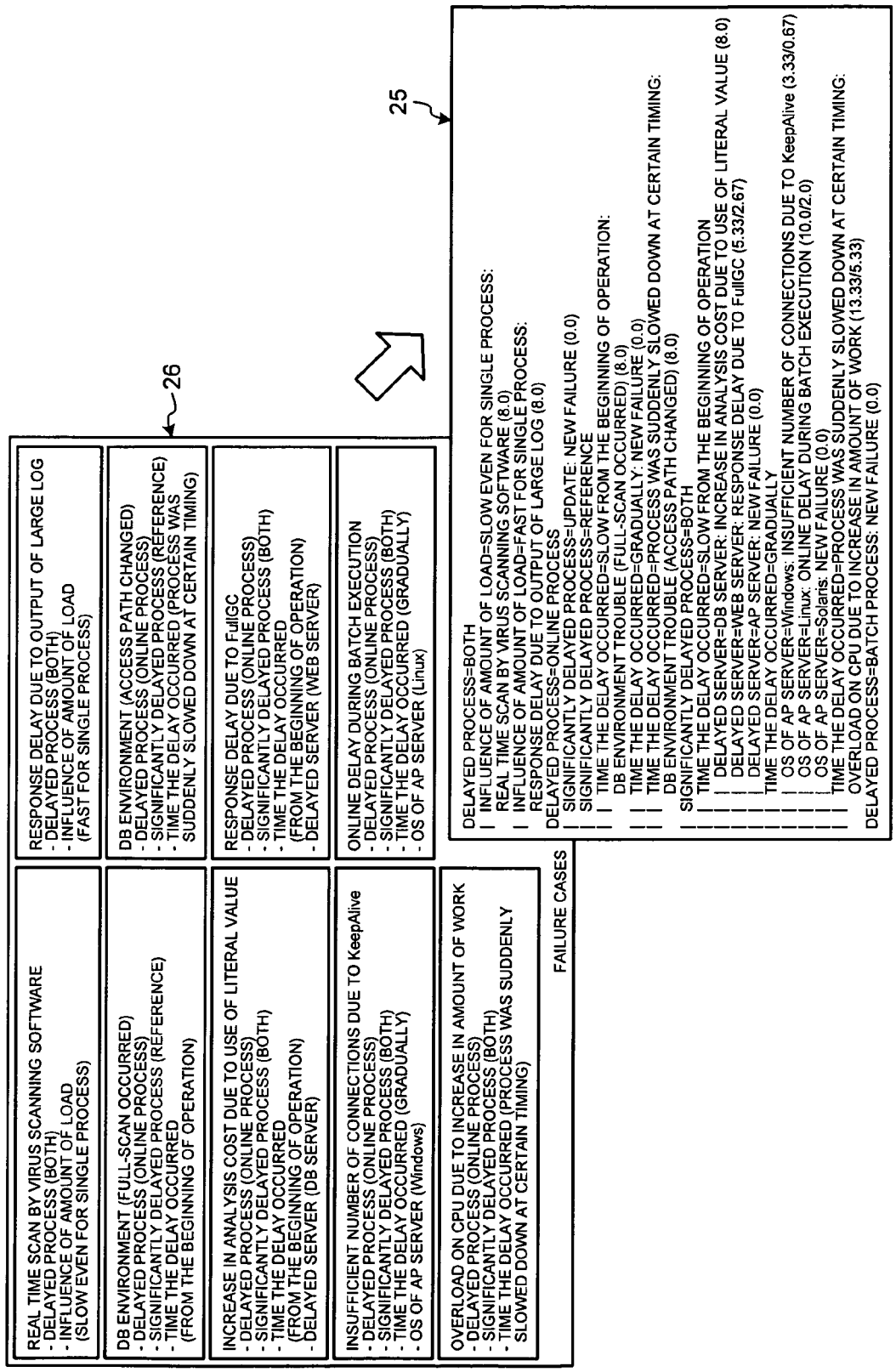
FIG. 9 is a diagram illustrating exemplary decision tree-use failure cases and an exemplary decision tree in the failure case learning stage.

After the decision tree-use failure cases 26 are created for all the failure cases, the decision tree construction unit 64 constructs the decision tree 25 illustrated in FIG. 9 from the constructed decision tree-use failure cases 26. In the constructed decision tree 25, not only the collected information described in each failure case is used as branch conditions, but also new branch conditions not described in the collected information can be added to each failure case. Therefore, with this decision tree, detailed estimation of the cause of a failure can be achieved, and the accuracy of the estimation can be improved.

Figure 10:
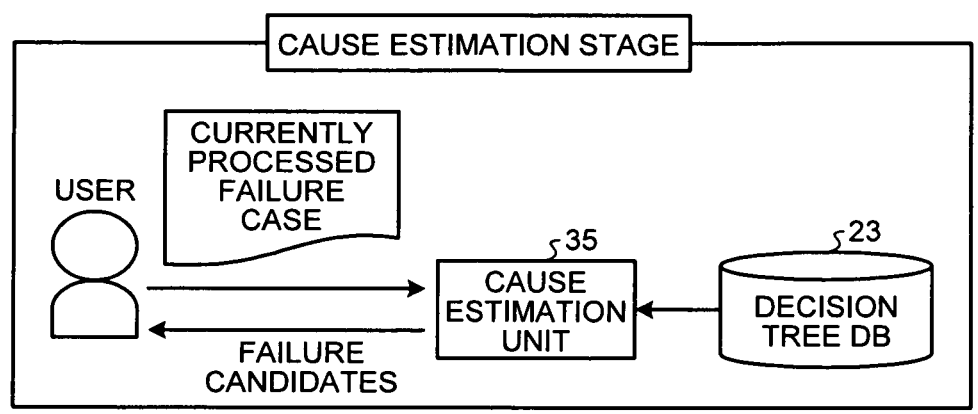
FIG. 10 is a diagram illustrating the operation in a cause estimation stage in the failure cause estimation device in the second embodiment.
Figure 11:
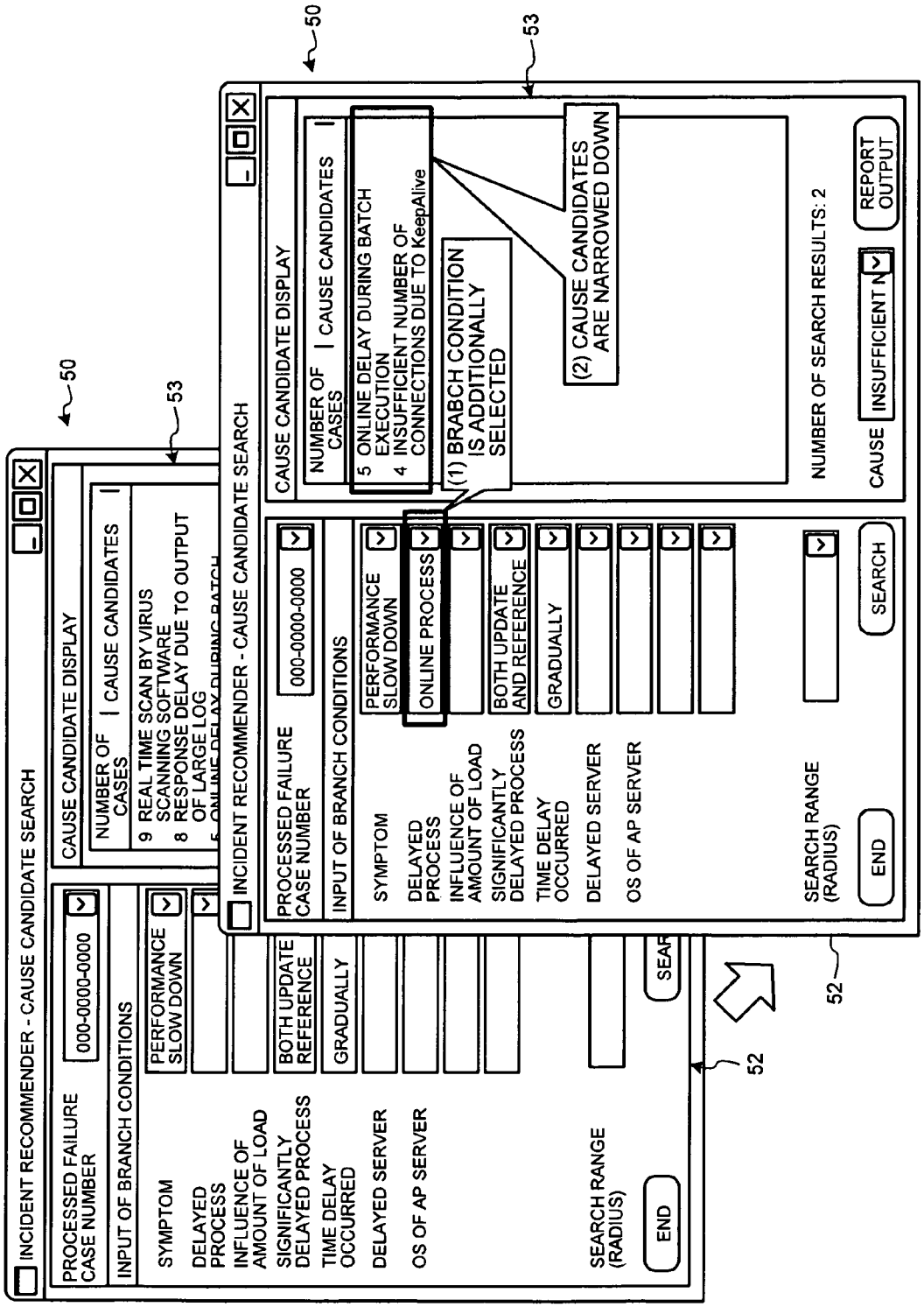
FIG. 11 is a diagram illustrating an example of changes on an input interface screen in the cause estimation stage.

The cause estimation stage will be next described. FIG. 10 is a diagram illustrating the operation in the cause estimation stage in the failure cause estimation device 10 in the second embodiment, and FIG. 11 is a diagram illustrating an example of changes on the input interface screen 50 in the cause estimation stage. For example, when the cause of the current failure case is estimated during a phone interview to inquire about the occurrence of a failure case, the failure cause estimation device 10 displays the input interface screen 50 on the display unit 11. The condition presentation unit 33 presents the branch conditions registered in the interview DB 22 in the condition presentation field 52 illustrated in FIG. 11. The user visually recognizes the branch conditions presented in the condition presentation field 52 and checks whether or not the presented branch conditions include a branch condition appropriate to the question and reply for the current failure case.

The condition selection unit 34 selects, according to the operation by the user, some of the branch conditions presented in the condition presentation field 52. More specifically, while the symptom and status of the current failure case are obtained through the interview, the user checks the branch conditions presented in the condition presentation field 52 and the cause candidates presented in the cause candidate presentation field 53 and then selects branch conditions appropriate to the current failure case. Then the cause estimation unit 35 estimates, from the decision tree 25, causes that satisfy the branch conditions selected by the condition selection unit 34. The cause candidate presentation unit 36 presents the causes estimated by the cause estimation unit 35 in the cause candidate presentation field 53 as cause candidates. Then the user adds or selects some of the branch conditions presented in the condition presentation field 52 to narrow down the causes satisfying these branch conditions. In the example illustrated in FIG. 11, when a reply "ONLINE PROCESS" is additionally selected for a question "DELAYED PROCESS" presented in the condition presentation field 52, the causes can be narrowed down to two cause candidates "ONLINE DELAY DURING BATCH EXECUTION" and "INSUFFICIENT NUMBER OF CONNECTIONS DUE TO KeepAlive" in the cause candidate presentation field 53.

The cause candidate selection unit 37 selects, according to the operation by the user, one of the cause candidates presented in the cause candidate presentation field 53. When a cause is selected by the cause candidate selection unit 37, the addition registration unit 38 uses the selected cause as the cause of the current failure case and additionally registers combinations of the questions and replies in the branch conditions used for the estimated cause in the failure case DB 21 as the current failure case.

The operation of the failure cause estimation device 10 when branch conditions for a failure case are additionally registered in the failure case DB 21 will be next described.

Figure 12:
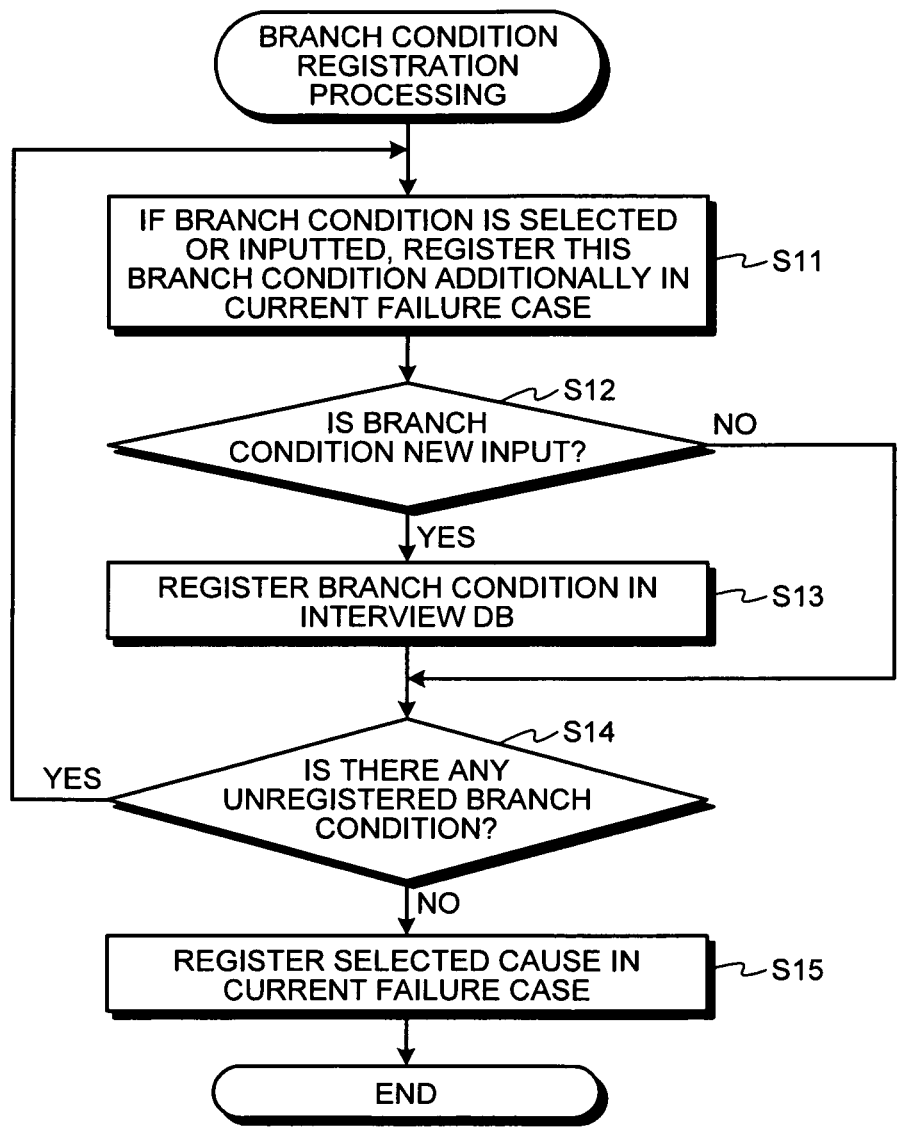
FIG. 12 is a flowchart illustrating the processing operation of a control unit in branch condition registration processing.

FIG. 12 is a flowchart illustrating the processing operation of the control unit 14 in the branch condition registration processing. Upon detection of the operation of the report output button 56, the addition registration unit 38 additionally registers, in the current failure case, one of the branch conditions presented in the condition presentation field 52 if the reply to the question for this branch condition has been selected or inputted (step S11). Then the addition registration unit 38 determines whether or not that branch condition is new input (step S12). If the branch condition is new input (yes in step S12), the addition registration unit 38 additionally registers the question and reply for the branch condition in the interview DB 22 (step S13).

Then the addition registration unit 38 determines whether or not the selected or inputted branch conditions presented in the condition presentation field 52 include an unregistered branch condition (step S14). If a determination is made by the addition registration unit 38 that there is an unregistered branch condition (yes in step S14), the process moves to step S11 to additionally register the unregistered branch condition in the failure case DB 21.

If there is no unregistered branch condition (no in step S14), the addition registration unit 38 additionally registers, in the current failure case, the cause selected from the cause candidate presentation field 53 by the cause candidate selection unit 37 (step S15), and the processing operation is ended. In this operation, a report of the failure case may be outputted. If a determination is made by the addition registration unit 38 that the branch condition is not new input (no in step S12), the process moves to step S14 to determine whether or not there is an unregistered branch condition.

Figure 13:
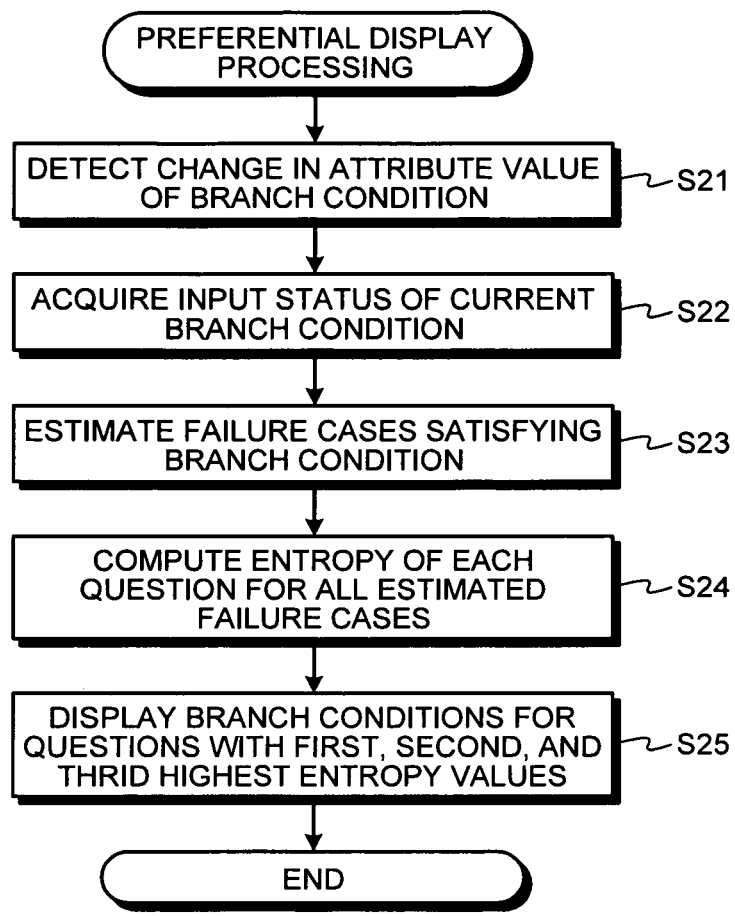
FIG. 13 is a flowchart illustrating the processing operation of the control unit in preferential display processing.

The operation of the preferential display processing unit 41 will be next described. FIG. 13 is a flowchart illustrating the processing operation of the control unit 14 in the preferential display processing. When the reply to a question presented in the condition presentation field 52 is selected, the preferential display processing unit 41 detects a change in the attribute value (reply) of the corresponding branch condition (step S21). Then the preferential display processing unit 41 acquires the input status of each of the currently selected branch conditions (step S22).

The preferential display processing unit 41 estimates failure cases that satisfy all the currently selected branch conditions (step S23) and then computes entropy indicating the selection probability for each question for the estimated failure cases (step S24). Then the preferential display processing unit 41 instructs the condition presentation unit 33 to present, in the condition presentation field 52, branch conditions for questions with the first, second, and third highest entropy values (step S25), and the processing operation is ended. Therefore, branch conditions with the first, second, and third highest selection possibilities can be preferentially presented in the condition presentation field 52, and the ease of the selection operation for these branch conditions can be improved.

Figure 14:
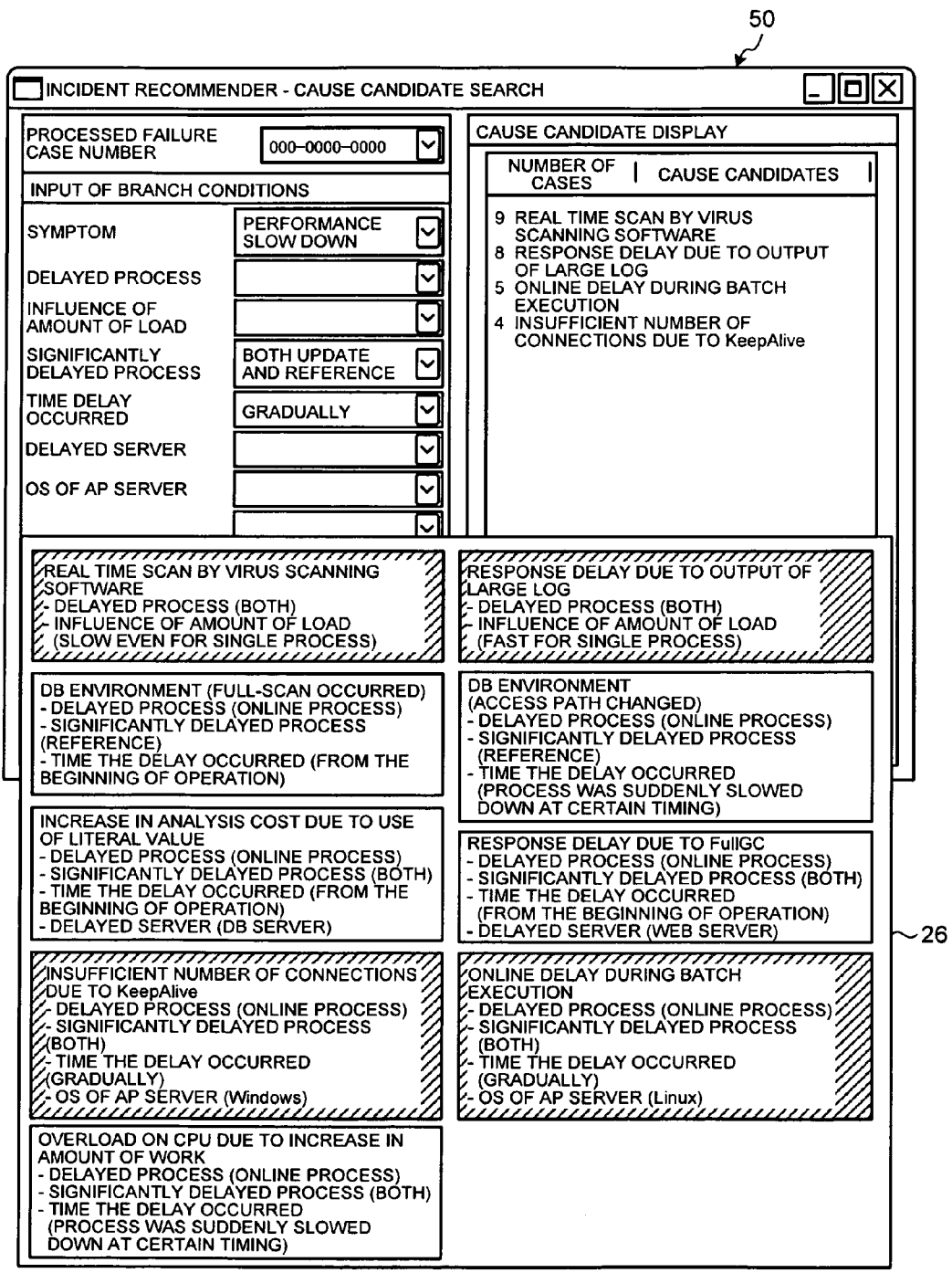
FIG. 14 is a diagram illustrating the relationship between an input interface screen and decision tree-use failure cases in the preferential display processing.

FIG. 14 is a diagram illustrating the relationship between the input interface screen 50 and the decision tree-use failure cases 26 used in the preferential display processing. In the example illustrated in FIG. 14, nine decision tree-use failure cases 26 are used. When no branch condition has been selected by the condition selection unit 34, the cause candidate presentation unit 36 presents the causes of the nine failure cases in the cause candidate presentation field 53 as cause candidates, although these are not illustrated in FIG. 14.

Suppose that the condition selection unit 34 selects the branch condition for a question "SIGNIFICANTLY DELAYED PROCESS" and a reply "BOTH UPDATE AND REFERENCE" and the branch condition for a question "TIME THE DELAY OCCURRED" and a reply "GRADUALLY" from the condition presentation field 52. Then the cause candidate presentation unit 36 presents, in the cause candidate presentation field 53, four causes, i.e., "REAL TIME SCAN BY VIRUS SCANNING SOFTWARE", "RESPONSE DELAY DUE TO OUTPUT OF LARGE LOG", "INSUFFICIENT NUMBER OF CONNECTIONS DUE TO KeepAlive", and "ONLINE DELAY DURING BATCH EXECUTION". Then the preferential display processing unit 41 computes entropy for each of the unselected questions "DELAYED PROCESS", "INFLUENCE OF AMOUNT OF LOAD", "DELAYED SERVER", and "OS OF AP SERVER". Then the preferential display processing unit 41 instructs the condition presentation unit 33 to present, in the condition presentation field 52, three questions "DELAYED PROCESS", "INFLUENCE OF AMOUNT OF LOAD", and "OS OF AP SERVER" with the first, second, and third highest entropy values in that order. The condition presentation unit 33 does not present "DELAYED SERVER" with the fourth highest entropy value.

If the entropy of a question is equal to or less than a reference threshold value, the preferential display processing unit 41 determines that this question is far less likely to be selected and prohibits the presentation of the branch condition for the question. By prohibiting the presentation of a branch condition that is far less likely to be selected, the ease of the selection operation for the rest of the branch conditions can be improved.

Figure 15:
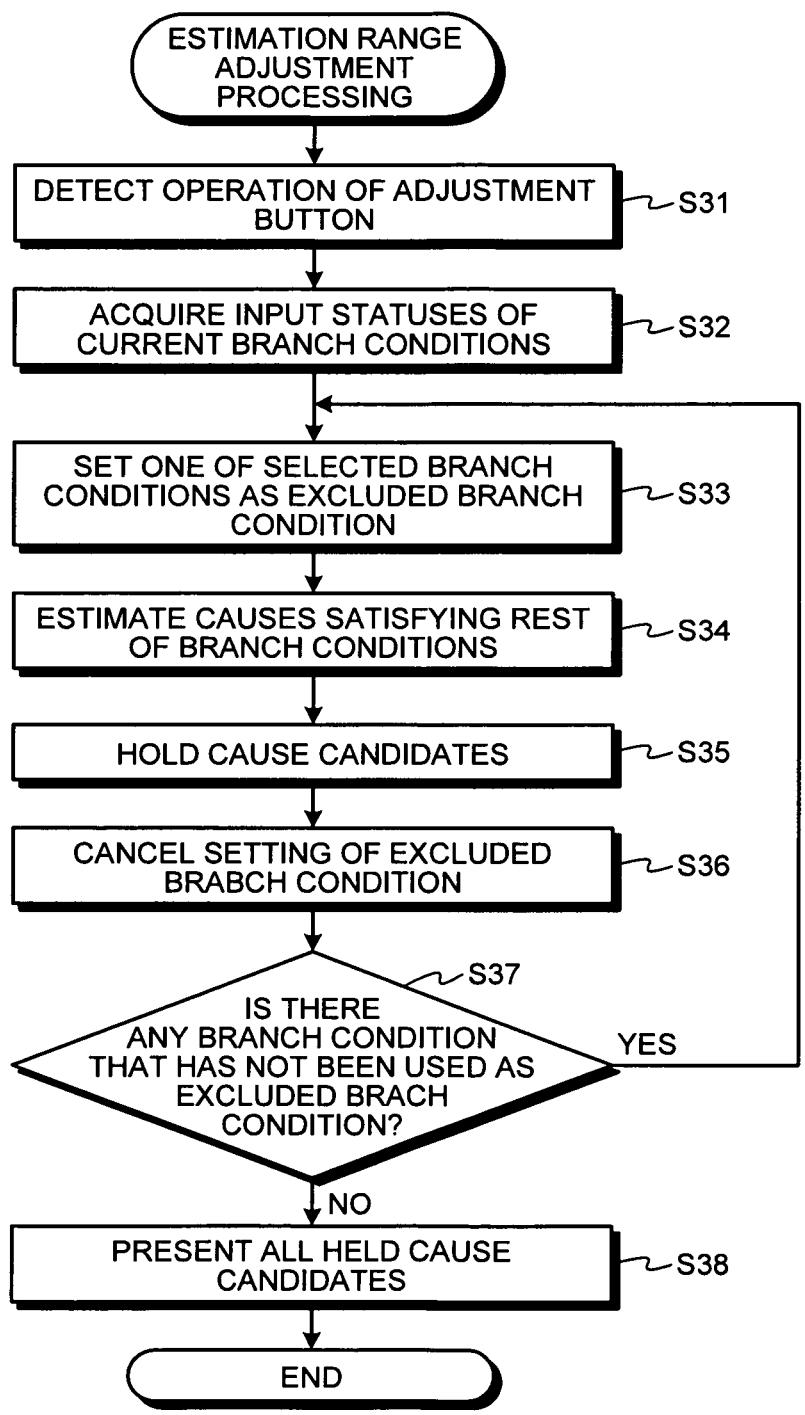
FIG. 15 is a flowchart illustrating the processing operation of the control unit in estimation range adjustment processing.

The operation of the estimation range adjustment processing unit 42 will be next described. FIG. 15 is a flowchart illustrating the processing operation of the control unit 14 in the estimation range adjustment processing. Upon detection of the operation of a re-search button (not illustrated) (step S31), the estimation range adjustment processing unit 42 acquires the currently selected branch conditions (step S32). Then the estimation range adjustment processing unit 42 sets one of the currently selected branch conditions as an excluded branch condition (step S33) and instructs the cause estimation unit 35 to estimate causes that satisfy the branch conditions other than the excluded branch condition (step S34).

The estimation range adjustment processing unit 42 holds the cause candidates estimated by the cause estimation unit 35 (step S35), cancels the setting of the excluded branch condition (step S36), and determines whether or not the currently selected branch conditions include any branch condition that has not been used as an excluded branch condition (step S37). If a determination is made by the estimation range adjustment processing unit 42 that there is a branch condition that has not been used as an excluded branch condition (yes in step S37), the process moves to step S33 to set that branch condition as an excluded branch condition.

If there is no branch condition that has not been used as an excluded branch condition (no in step S37), the estimation range adjustment processing unit 42 instructs the cause candidate presentation unit 36 to present all the held cause candidates in the cause candidate presentation field 53 (step S38), and the processing operation is ended. Therefore, even if no cause appropriate to the current failure case remains after branch conditions are sequentially selected to narrow down cause candidates, a possible cause obtainable under the currently selected branch conditions can be presented by performing the search again.

FIG. 16 is a diagram illustrating an example of the operation of the estimation range adjustment processing unit 42. Supposed that the condition selection unit 34 selects the branch condition for a question "DELAYED PROCESS" and a reply "ONLINE PROCESS", the branch condition for a question "SIGNIFICANTLY DELAYED PROCESS" and a reply "BOTH", and the branch condition for a question "TIME THE DELAY OCCURRED" and a reply "CERTAIN TIMING".

In this case, the cause candidate presentation unit 36 presents one cause "OVERLOAD ON CPU DUE TO INCREASE IN AMOUNT OF WORK" in the cause candidate presentation field 53. Suppose that the user finds, as a result of the examination of the cause "OVERLOAD ON CPU DUE TO INCREASE IN AMOUNT OF WORK", that the cause is not appropriate to the cause of the current failure case. In this case, upon detection of the operation of the re-search button, the estimation range adjustment processing unit 42 instructs the cause estimation unit 35 to sequentially estimate causes using different combination patterns of branch conditions.

For example, the cause estimation unit 35 then estimates causes that satisfy branch conditions "DELAYED PROCESS: ONLINE PROCESS" and "SIGNIFICANTLY DELAYED PROCESS: BOTH", except for "TIME THE DELAY OCCURRED: PARTICULAR TIMING". As a result of the estimation, the cause estimation unit 35 estimates five causes "INCREASE IN ANALYSIS COST DUE TO USE OF LITERAL VALUE", "RESPONSE DELAY DUE TO FullGC", "INSUFFICIENT NUMBER OF CONNECTIONS DUE TO KeepAlive", "ONLINE DELAY DURING BATCH EXECUTION", and "OVERLOAD ON CPU DUE TO INCREASE IN AMOUNT OF WORK" and then holds these estimated causes.

Then the cause estimation unit 35 further estimates causes that satisfy branch conditions "DELAYED PROCESS: ONLINE PROCESS" and "TIME THE DELAY OCCURRED: PARTICULAR TIMING", except for "SIGNIFICANTLY DELAYED PROCESS: BOTH". As a result of the estimation, the cause estimation unit 35 estimates two causes "DB ENVIRONMENT (ACCESS PATH CHANGED)" and "OVERLOAD ON CPU DUE TO INCREASE IN AMOUNT OF WORK" and holds these estimated causes.

Then the cause estimation unit 35 further estimates causes that satisfy branch conditions "SIGNIFICANTLY DELAYED PROCESS: BOTH" and "TIME THE DELAY OCCURRED: PARTICULAR TIMING", except for "DELAYED PROCESS: ONLINE PROCESS". As a result of the estimation, the cause estimation unit 35 estimates three causes "REAL TIME SCAN BY VIRUS SCANNING SOFTWARE", "RESPONSE DELAY DUE TO OUTPUT OF LARGE LOG", and "OVERLOAD ON CPU DUE TO INCREASE IN AMOUNT OF WORK" and holds these estimated causes.

The cause candidate presentation unit 36 computes the logical products of the held estimated causes and presents eight cause candidates in the cause candidate presentation field 53.

382 failure cases for the operation and management of a software package were examined using the failure cause estimation device 10 in the second embodiment. The number of branch conditions was 183 (the number of symptoms: 38, the number of problematic components: 7, the number of commands most recently executed: 31, the number of error messages: 90, and the number of cooperative applications: 17). Older 282 failure cases were used to create a decision tree. Then 30 cases out of 100 remaining newer failure cases that were similar to the 282 older failure cases were used to estimate their causes using the created decision tree, and the ratio of resolved failure cases was evaluated. Estimated causes were narrowed down each time a branch condition was inputted, and a failure case was considered resolved if a plurality of final causes included the correct cause. With a conventional decision tree, the ratio of resolved failure cases was about 0%. However, with the decision tree in this embodiment, 19 out of the 30 failure cases were resolved using the presented causes, and the ratio of resolved failure cases was found to be 63%. This proves that the ratio of resolved failure cases can be significantly increased as compared with that in the conventional case.

In the second embodiment, the questions and replies registered in the interview DB 22 are presented in the condition presentation field 52 as branch conditions in a selectable manner, and cause candidates satisfying selected branch conditions are presented in the cause candidate presentation field 53. Therefore, branch conditions that cannot be obtained using conventional collected information and correspond to the questions and replies obtained from, for example, an interview can be selected from the condition presentation field 52. More specifically, by setting the format of the branch conditions, notational variants of additional branch conditions can be absorbed. In addition, by registering branch conditions reflecting the results of the interview, the estimation accuracy of the cause candidates can be improved.

In the second embodiment, the cause corresponding to the current failure case is selected from the causes presented in the cause candidate presentation field 53, and the selected cause and combinations of the problems and replies in all the branch conditions used for the estimation of causes are additionally registered in the failure case DB 21 as the current failure case. Therefore, by registering the cause and the problems and replies for the branch conditions reflecting the results of the interview in the failure case DB 21 as the current failure case, the contents of the data can be increased. Since the cause of the current failure case is selected while branch conditions are selected, the registration of a failure case not including the description of its cause, which can occur in the conventional procedure, can be prevented in a reliable manner. Therefore, by registering the cause and the branch conditions obtained by the interview in the failure case DB 21 as a failure case, the reuse ratio of failure cases can be improved.

In the second embodiment, even when no branch condition appropriate to the current failure case is presented in the condition presentation field 52, a new branch condition can be inputted by inputting a new question and a new reply. Therefore, even when no branch condition appropriate to the current failure case is presented in the condition presentation field 52, the branch condition reflecting the new question and reply can be inputted, and cause candidates satisfying the new branch condition can be presented. Moreover, by registering a failure case reflecting the new branch condition in the failure case DB 21, the contents of the data can be increased.

In the second embodiment, the branch conditions registered in the interview DB 22 are used to extract the cause, questions, and replies for each of the failure cases registered in the failure case DB 21, and the decision tree 25 is constructed using the causes, questions, and replies for the failure cases. Therefore, a decision tree 25 reflecting not only the collected information used also in the conventional procedure but also the results of interviews that cannot be obtained from the collected information can be constructed.

In the second embodiment, each time a branch condition is selected in the condition presentation field 52, an evaluation value indicating the selection possibility is computed for each of the questions, and branch conditions for the questions are preferentially presented in the condition presentation field 52 in descending order of evaluation value. Therefore, the user can recognize the branch conditions for these questions with high selection possibilities in the condition presentation field 52 at each selection operation, and the ease of the selection operation for these branch conditions can be improved.

In the second embodiment, each time a branch condition is selected in the condition presentation field 52, an evaluation value indicating the selection possibility is computed for each of the questions. When the evaluation value of a question is equal to or less than a reference threshold value, the presentation of the branch condition for that question in the condition presentation field 52 is prohibited. Therefore, a branch condition for a question with a very low selection possibility is not presented, and the ease of the selection operation for the rest of the branch conditions can be improved.

In the second embodiment, the cause candidates are narrowed down by sequentially selecting branch conditions. Therefore, even if no cause appropriate to the current failure case is presented after the sequential selection of the branch conditions, re-search is performed to sequentially estimate causes that satisfy all the selected branch conditions except for one branch condition. Therefore, all possible causes obtainable from the currently selected branch conditions can be presented in the cause candidate presentation field 53 by one-touch operation.

In the above embodiment, entropy is used for evaluation in the preferential display processing unit 41. However, other indexes such as Gini index may be used. In the above embodiment, when the input status of each of the branch conditions is acquired in step S22 of the preferential display processing in FIG. 13, computation for all possible input statuses is performed, and questions with the first, second, and third highest computed entropy values are stored. Therefore, rapid preferential display processing can be achieved using the stored results.

The constituent components of the devices illustrated in the figures are not necessarily configured physically in the manner illustrated in the figures. More specifically, the specific configuration of the distribution and integration of the constituent components is not limited to those illustrated in the figures. A part of or all the constituent components may be freely distributed or integrated functionally or physically according to various loads, use conditions, and other factors.

A part of or all the various processing functions used in each device may be executed on a CPU (Central Processing Unit) (or a micro computer such as an MPU (Micro Processing Unit) or an MCU (Micro Controller Unit). It is appreciated that a part of or all the various processing functions may be achieved on a program executed on a CPU (or a micro computer such as an MPU or an MCU) or a wired logic hardware device.

Figure 17:
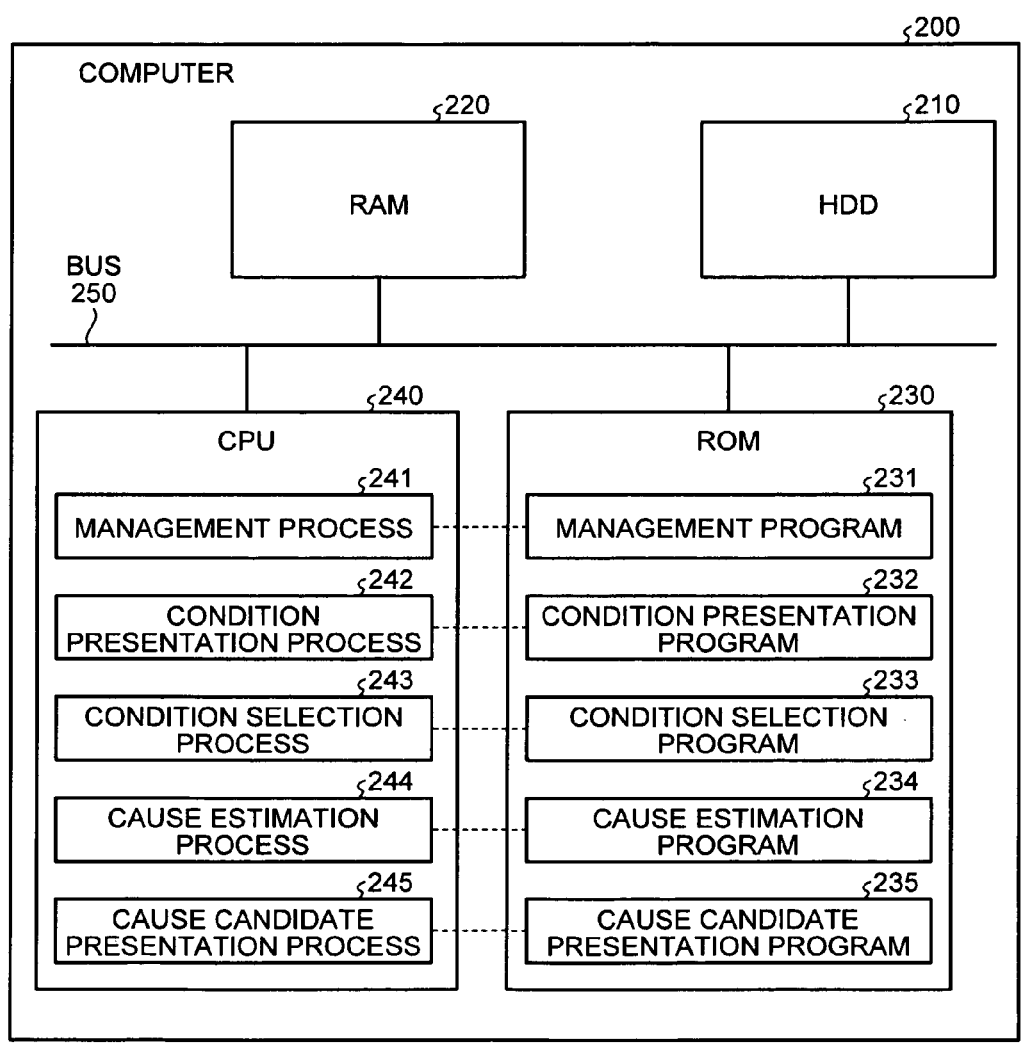
FIG. 17 is a diagram illustrating a computer that executes failure cause estimation programs.
Figure 18:
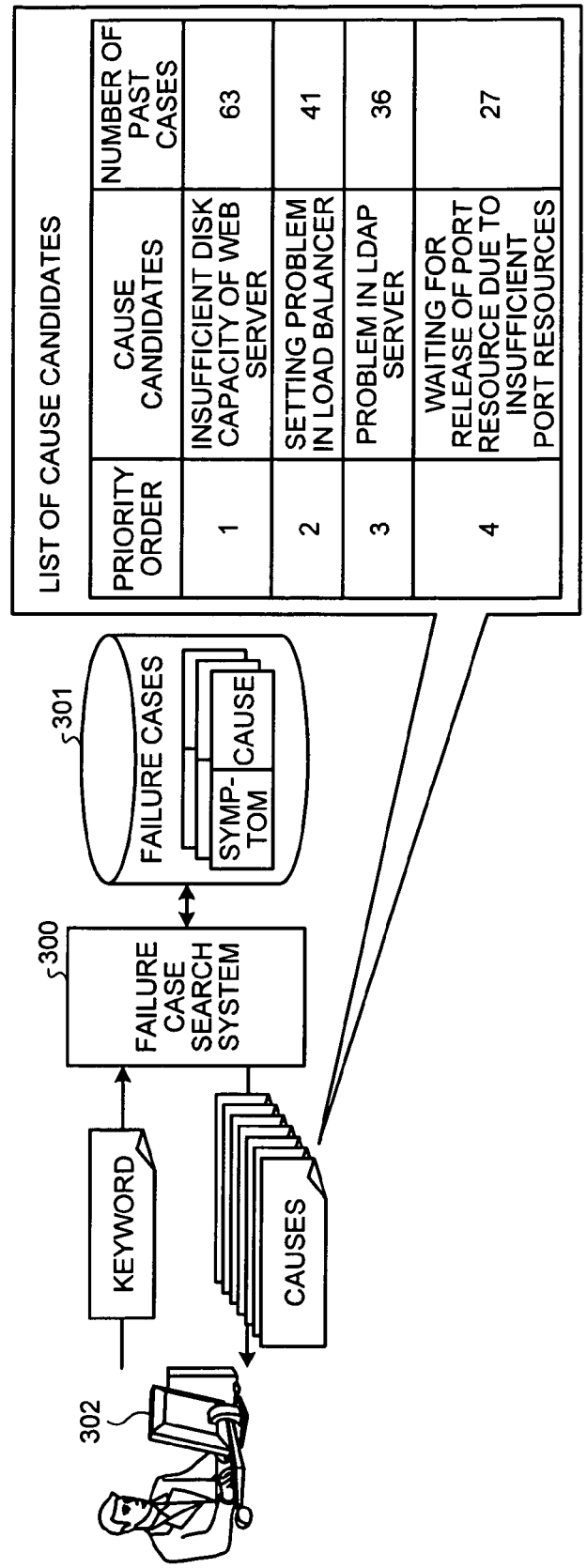
FIG. 18 is a diagram illustrating an exemplary conventional failure case search system.
Figures 19, 20:
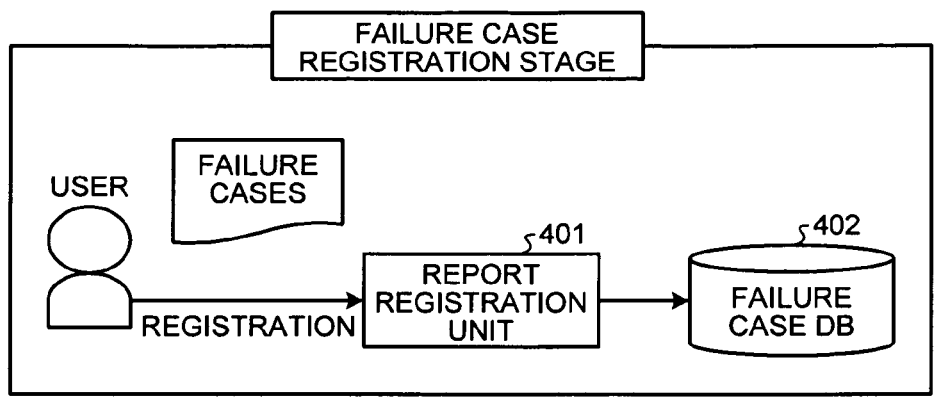
FIG. 19 is a diagram illustrating the operation in a failure case registration stage in a conventional failure cause estimation device.
FIG. 20 is a diagram illustrating an exemplary data structure of a failure case used in the conventional failure cause estimation device.
Figure 21:
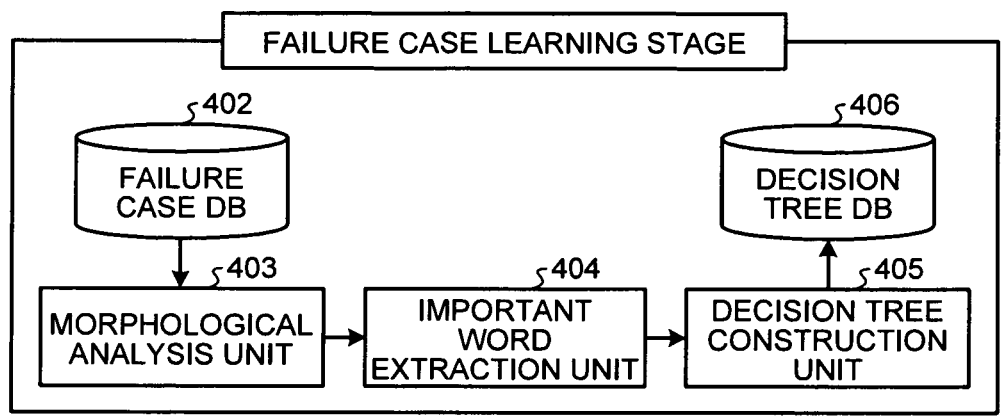
FIG. 21 is a diagram illustrating the operation in a failure case learning stage in the conventional failure cause estimation device.
Figure 22:
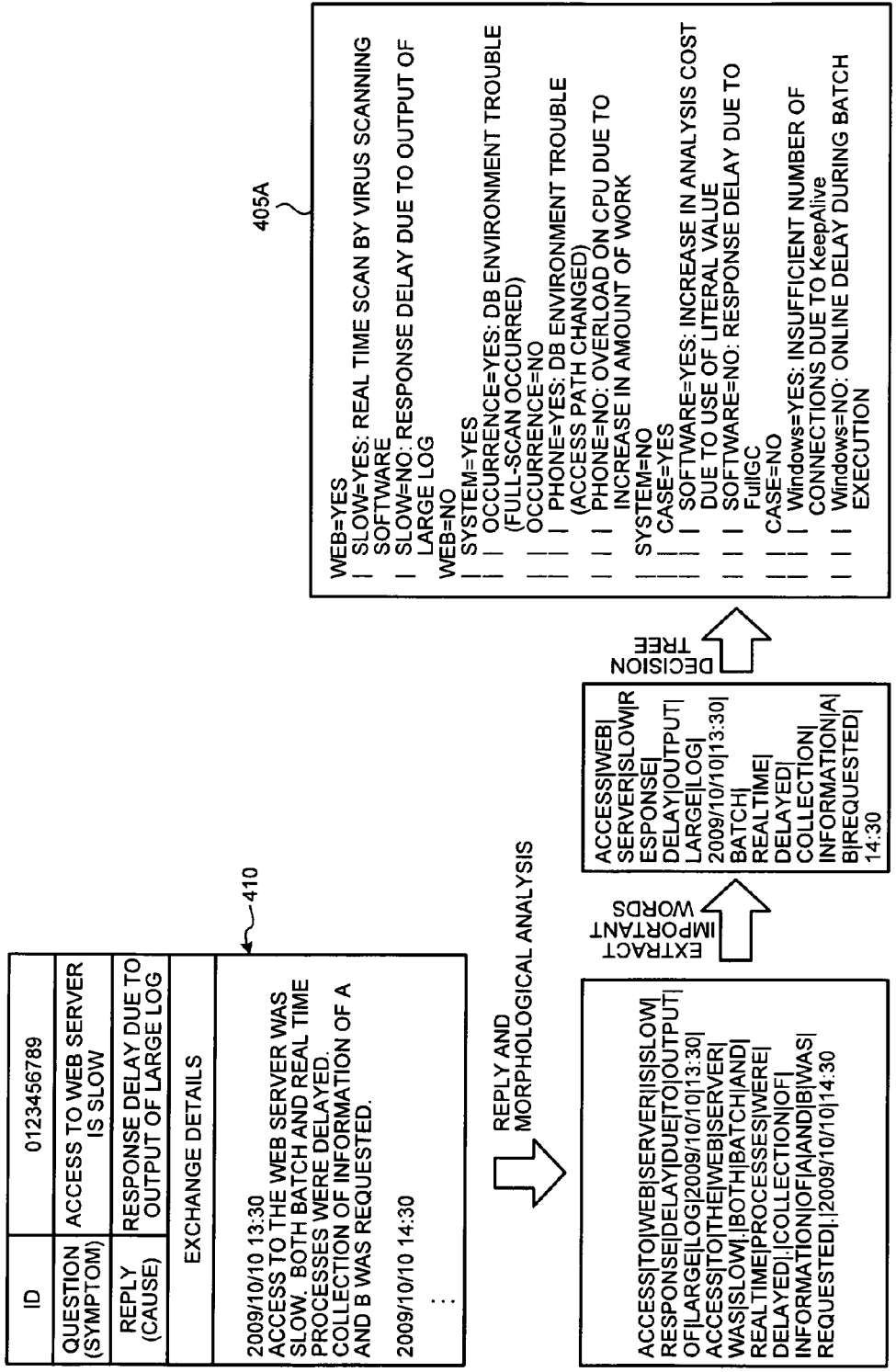
FIG. 22 is a diagram illustrating a series of operations until a decision tree is constructed in the failure case learning stage.
Figure 23:
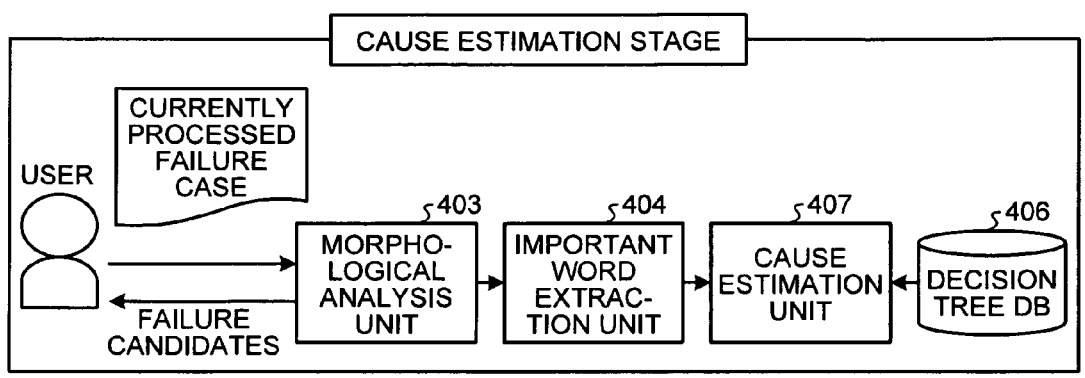
FIG. 23 is a diagram illustrating the operation in a cause estimation stage in the conventional failure cause estimation device.

The various types of processing described in the above embodiment can be achieved by executing pre-installed programs on a computer. Therefore, an exemplary computer that executes programs having the same functions as those in the above embodiment will be next described with reference to FIG. 17. FIG. 17 is a diagram illustrating the computer that executes failure cause estimation programs.

As illustrated in FIG. 17, a computer 200 used for the failure cause estimation program includes an HDD (Hard Disk Drive) 210, a RAM (Random Access Memory) 220, a ROM (Read Only Memory) 230, and a CPU 240, which are connected through a bus 250.

The failure cause estimation programs having functions similar to those in the above embodiment (i.e., a management program 231, a condition presentation program 232, a condition selection program 233, a cause estimation program 234, and a cause candidate presentation program 235) are pre-stored in the ROM 230, as illustrated in FIG. 17. The programs 231 to 235 may be appropriately integrated or dispersed as in the constituent components of the failure cause estimation device illustrated in FIG. 1.

The CPU 240 reads the programs 231 to 235 from the ROM 230 and execute them, and the programs 231 to 235 function as a management process 241, a condition presentation process 242, a condition selection process 243, a cause estimation process 244, and a cause candidate presentation process 245, respectively, as illustrated in FIG. 17.

The CPU 240 manages the causes of past failure cases, questions for each failure case, replies to the questions registered in the HDD 210 case by case. The CPU 240 presents combinations of the questions and the replies thereto managed in the HDD 210 on a display screen as branch conditions used to classify the cause of a failure case. The CPU 240 selects at least one branch condition from the presented branch conditions according to selection operation. The CPU 240 estimates, according to selection operation, causes satisfying the selected branch condition from the contents of the HDD 210. Then the CPU 240 presents the estimated causes on the display screen as cause candidates.

Therefore, since branch conditions for the questions and replies that are obtained by, for example, an interview and cannot be obtained from conventional collected information can be selected on the display screen, notational variants in the branch conditions can be absorbed. In addition, since the branch conditions reflecting the results of the interview can be acquired, the estimation accuracy for the cause candidates can be improved.

An embodiment of the failure cause estimation device can support branch conditions corresponding to additional questions and replies obtained from, for example, interviews. Accordingly, notational variants in the additional branch conditions can be absorbed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A failure cause estimation device comprising:
a first database that stores causes of past failure cases, questions, and replies thereto for each of the past failure cases;
a second database that stores combinations of the questions and the replies, the combinations being used to classify a cause of a failure case; and
a processor coupled to the first data base and the second data base,
wherein the processor executes a process comprising:
presenting the combinations of the questions and the replies thereto stored in the second database, as branch conditions;
accepting an input of a new branch condition including a combination of a question and a reply, the combination being not presented as the branch conditions;
storing the new branch condition in the second database;

estimating, with reference to the first database, at least one cause satisfying the new branch condition and at least one branch condition selected from the presented branch conditions; and presenting the estimated at least one cause as at least one cause candidate.

2. The failure cause estimation device according to claim 1, wherein the process further comprises:

selecting a cause candidate from the at least one presented cause candidate, the selected cause candidate being used as the cause of the failure case;

storing, according to an addition registration operation, the selected cause and a combination of the question and the reply included in the at least one branch condition used to estimate the at least one cause, in the first database as a new failure case; and storing the combination of the question and the reply in the second database, the combination being used to classify the new failure case.

3. The failure cause estimation device according to claim 1, wherein the process further comprises:

allowing a new question and a new reply to be inputted, and selecting a combination of the new question and the new reply to the new question or a combination of one of the presented questions and the new reply to the one of the questions as a new branch condition according to an input operation.

4. The failure cause estimation device according to claim 1, wherein the process further comprises:

constructing a decision tree used when the cause of the failure case to be estimated is estimated from the causes, the questions, and the replies that are stored in the first database for each of the past failure cases, and wherein the estimating includes using the decision tree to estimate a cause satisfying the at least selected one branch condition.

5. The failure cause estimation device according to claim 1, wherein the presenting of the combinations includes computing an evaluation value indicating a selection possibility for each of the questions each time a branch condition is selected and presenting the branch conditions for the questions in descending order of the evaluation value.

6. The failure cause estimation device according to claim 5, wherein, when the evaluation value of any one of the questions is equal to or less than a reference threshold value, the presenting of the combinations includes prohibiting the branch condition for the any one of the questions from being presented.

7. The failure cause estimation device according to claim 1, wherein, after the at least one cause satisfying the at least selected one branch condition is estimated and when re-search operation is detected, the estimating sequentially includes estimating another at least one cause that satisfies the at least one branch condition except for one of the at least one branch condition while the one of the at least one branch condition is sequentially changed, and wherein the presenting of the cause candidate includes presenting the another at least one cause sequentially estimated as another at least one cause candidate.

8. A failure cause estimation method of a failure cause estimation device, the failure cause estimation method comprising:

accessing a first database storing causes of past failure cases, questions, and replies thereto for each of the past failure cases, and a second database storing combinations of the questions and the replies, the combinations being used to classify a cause of a failure case;

presenting combinations of the questions and the replies thereto stored in the second database, as branch conditions;

accepting an input of new branch condition including a combination of a question and a reply, the combination being not presented as the branch conditions;

storing the new branch condition in the second database;

estimating, with reference to the first database, at least one cause satisfying the new branch condition and at least one branch condition selected from the presented branch conditions; and presenting the estimated at least one cause as at least one cause candidate.

9. A computer-readable, non-transitory medium storing a failure cause estimation program causing a computer to execute a process comprising:

accessing a first database storing causes of past failure cases, questions, and replies thereto for each of the past failure cases, and a second database storing combinations of the questions and the replies, the combinations being used to classify a cause of a failure case;

presenting combinations of the questions and the replies thereto stored in the second database as branch conditions;

accepting an input of a new branch condition including a combination of a question and a reply, the combination being not presented as the branch conditions;

storing the new branch condition in the second database;

estimating, with reference to the first database, at least one cause satisfying the new branch condition and at least one branch condition selected from the presented branch conditions; and presenting the estimated at least one cause as at least one cause candidate.

10. A failure cause estimation apparatus comprising:

a processor for accessing a first database storing causes of past failure cases, questions, and replies thereto for each of the past failure cases, and a second database storing combinations of the questions and the replies, the combinations being used to classify a cause of a failure case;

presenting combinations of the questions and the replies thereto stored in the second database, as branch conditions;

accepting an input of a new branch condition including a combination of a question and a reply, the combination being not presented as the branch conditions;

storing the new branch condition in the second database;

estimating, with reference to the first database, at least one cause satisfying the new branch condition and at least one branch condition selected from the presented branch conditions; and presenting the estimated at least one cause as at least one cause candidate.

* * * * *

UNITED STATES PATENT AND TRADEMARK OFFICE
CERTIFICATE OF CORRECTION

| | |
|---|---|
| PATENT NO. | : 8,499,195 B2 |
| APPLICATION NO. | : 13/064462 |
| DATED | : July 30, 2013 |
| INVENTOR(S) | : Kuniaki Shimada et al. |

It is certified that error appears in the above-identified patent and that said Letters Patent is hereby corrected as shown below:

In the Claims

In Column 18, Line 12, In Claim 8, before "new" insert -- a --.

Signed and Sealed this
Eighteenth Day of February, 2014

Michelle K. Lee
*Deputy Director of the United States Patent and Trademark Office*